United States Patent [19]

Richardson et al.

[11] 4,358,016
[45] Nov. 9, 1982

[54] DOCUMENT SORTER APPARATUS

[75] Inventors: James M. Richardson, Westland, Mich.; James Rubino, Camarillo, Calif.

[73] Assignee: Burroughs Corporation, Detroit, Mich.

[21] Appl. No.: 13,615

[22] Filed: Feb. 21, 1979

[51] Int. Cl.³ .............................................. B07C 5/00
[52] U.S. Cl. .................................... 209/564; 209/569; 209/583
[58] Field of Search ............... 209/554, 559, 563, 564, 209/569, 583, 900, 546, 548, 549, 534, 552

[56] References Cited

U.S. PATENT DOCUMENTS

| | | | |
|---|---|---|---|
| 3,264,630 | 8/1966 | Conklin | 209/548 X |
| 3,904,516 | 9/1975 | Chiba et al. | 209/583 X |
| 3,938,663 | 2/1976 | Carnes et al. | 209/534 |
| 3,993,193 | 11/1976 | Welch et al. | 209/549 |
| 4,124,121 | 11/1978 | Sung et al. | 209/583 |
| 4,179,031 | 12/1979 | Ward | 209/534 |

Primary Examiner—Joseph J. Rolla
Attorney, Agent, or Firm—Delbert P. Warner; Kenneth J. Cooper; Kevin R. Peterson

[57] ABSTRACT

Document sorting apparatus for sorting documents having data characters recorded thereon into a selected one of a plurality of storage pockets depending upon the data characters. Sorter controllers, each associated with a pre-determined number of the storage pockets, are provided for controlling the gate mechanisms of the storage pockets within their respective control areas so as to direct the document into the selected one of the pockets. The sorter controllers comprise single cycle processors which execute program instructions stored in memory in implementing document tracking functions. Further, the sorter controllers are responsive to destination and sequential tracking numbers assigned to each document by a central processor for recognizing a document as being intended for a pocket within its control area.

9 Claims, 18 Drawing Figures

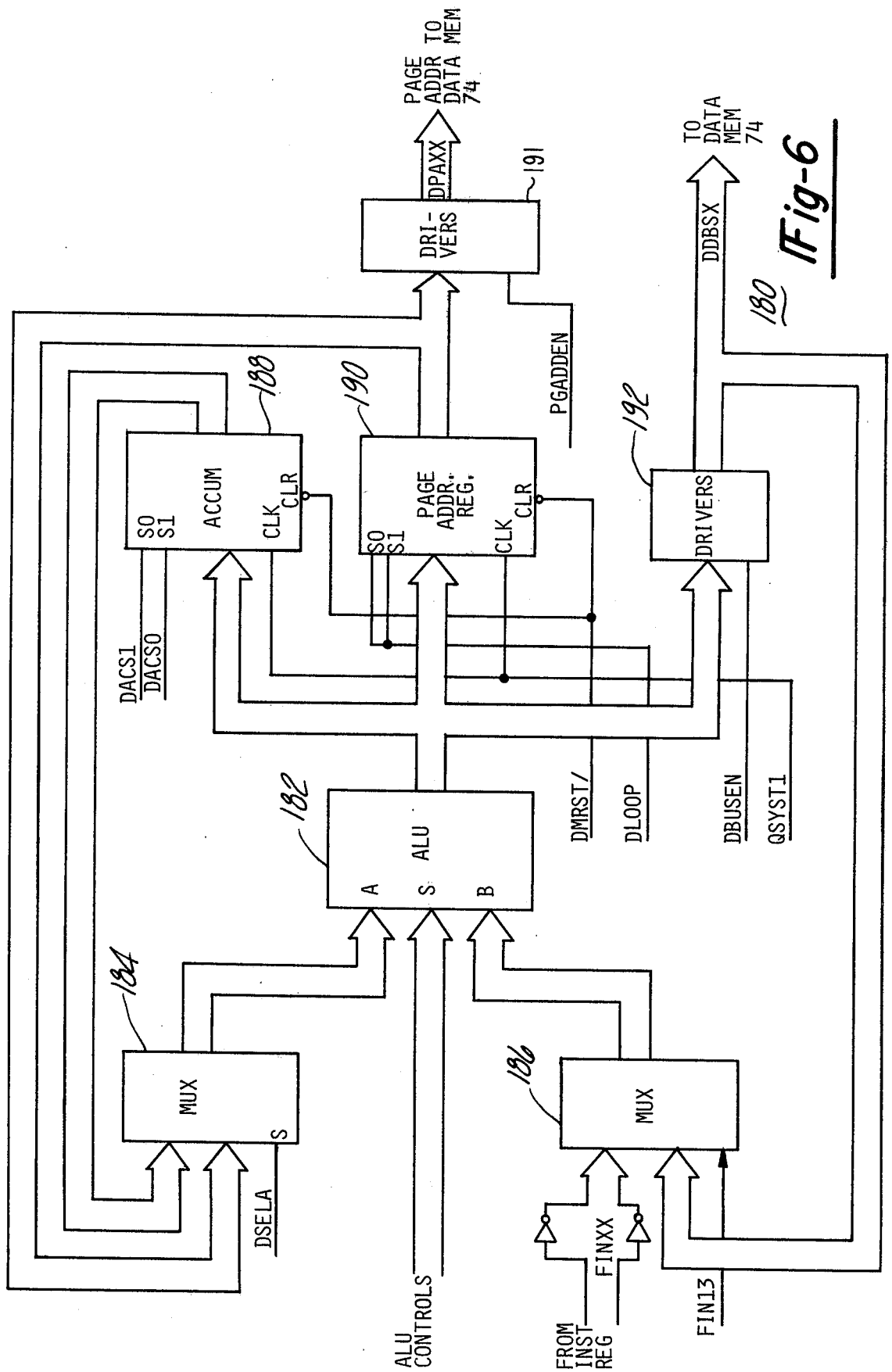

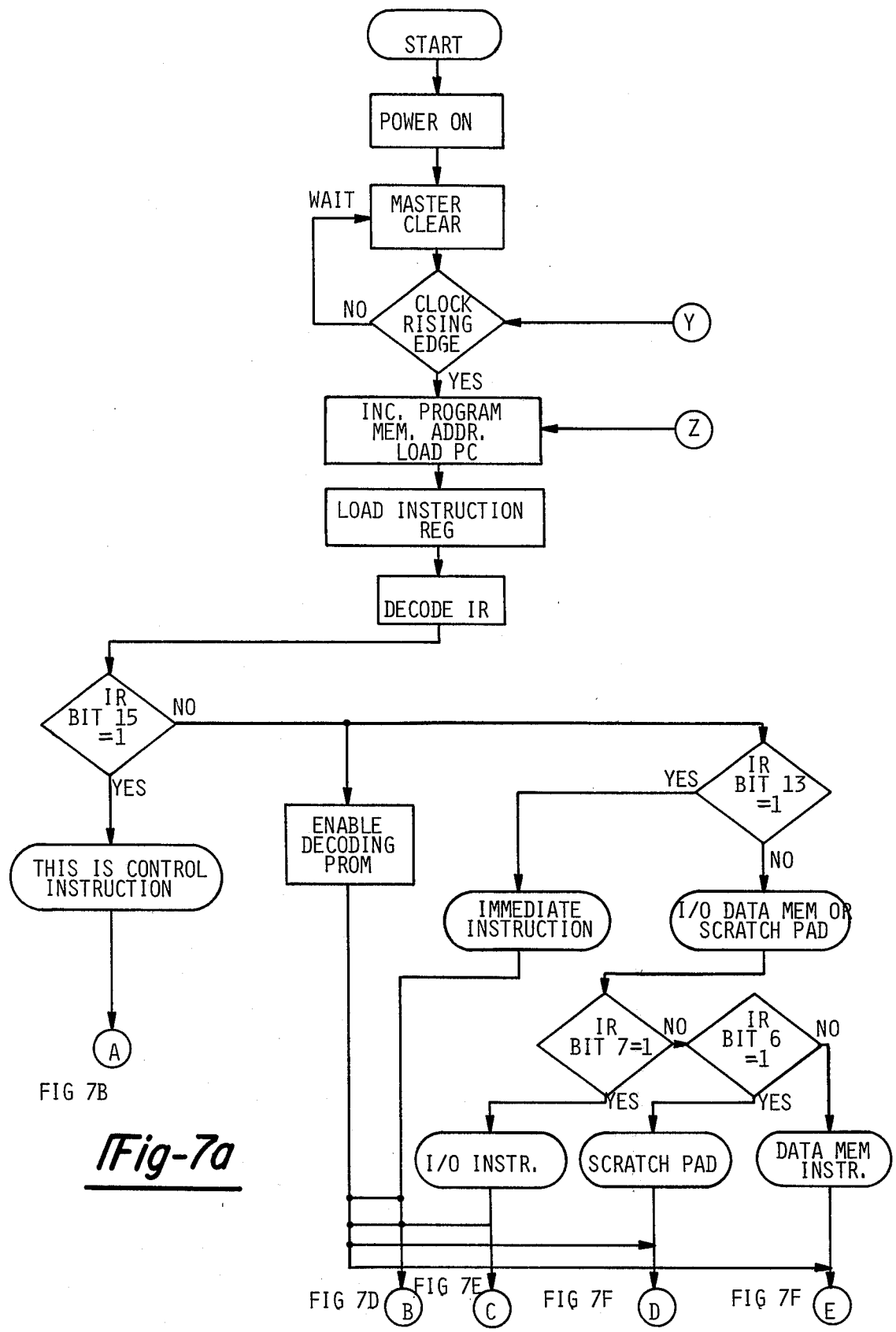

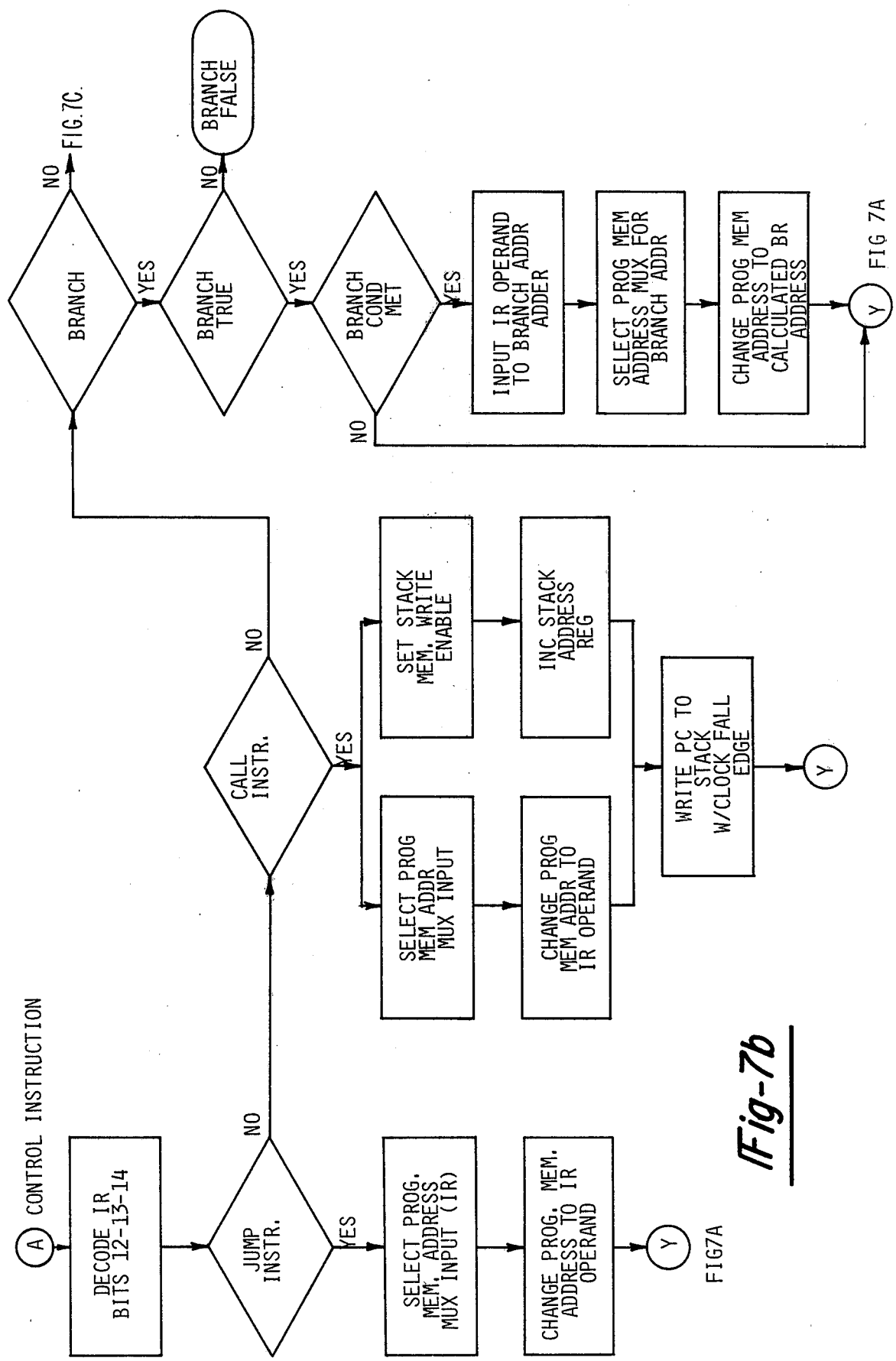

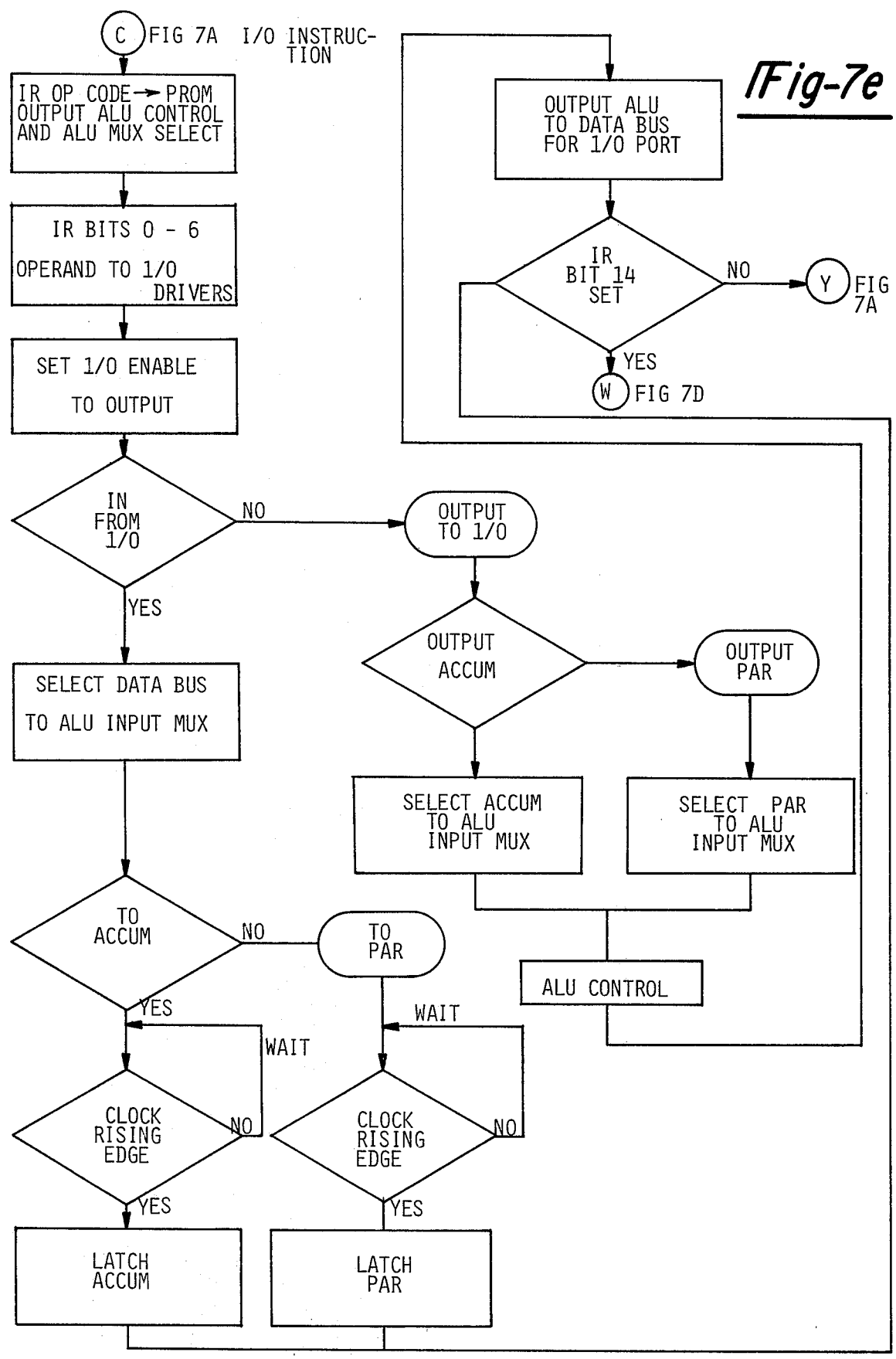

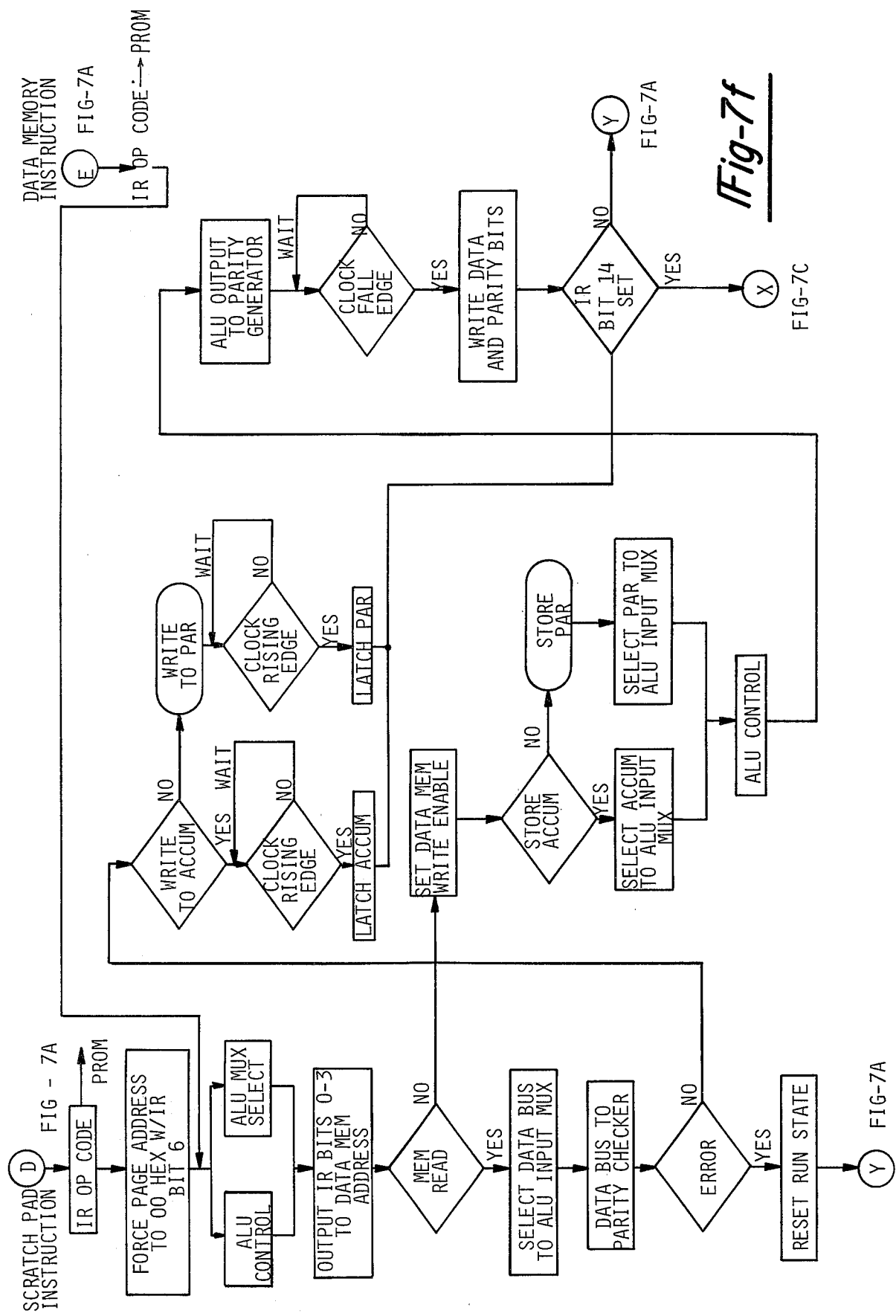

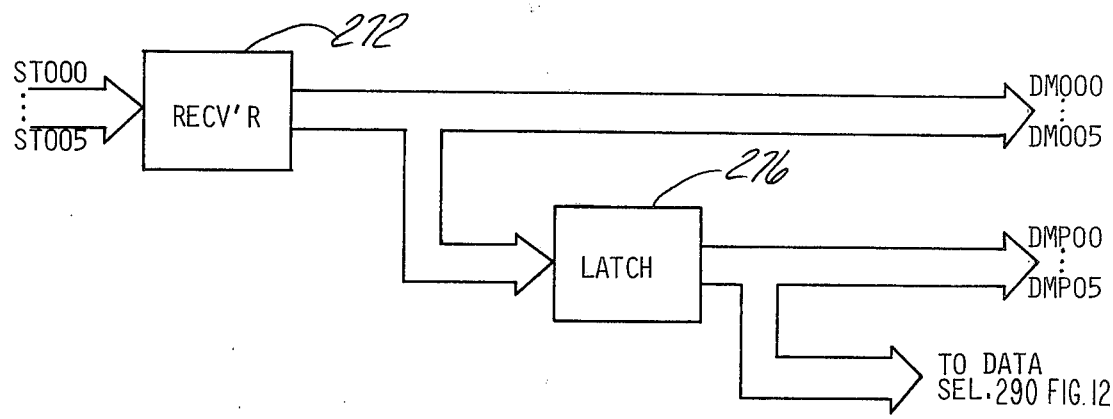
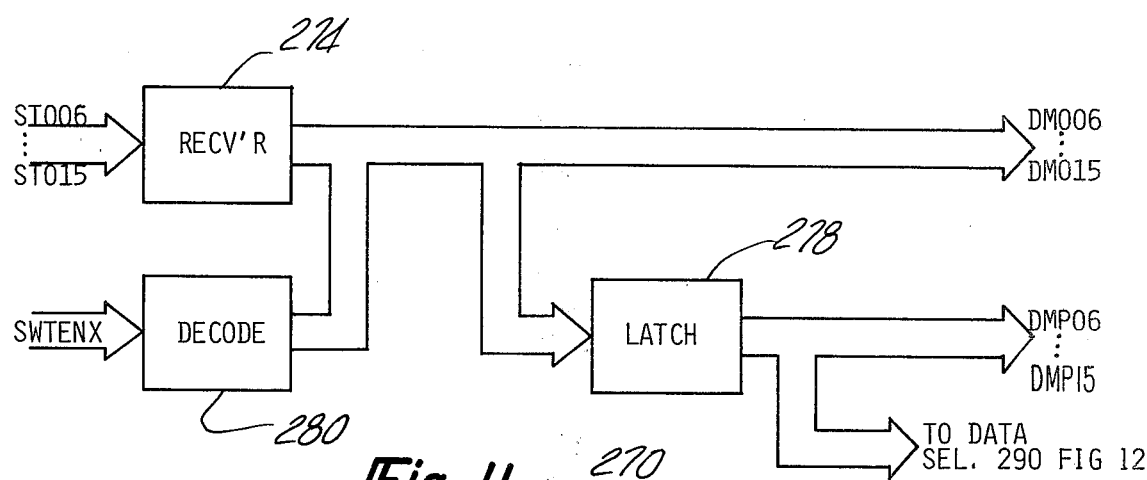
*Fig-11*
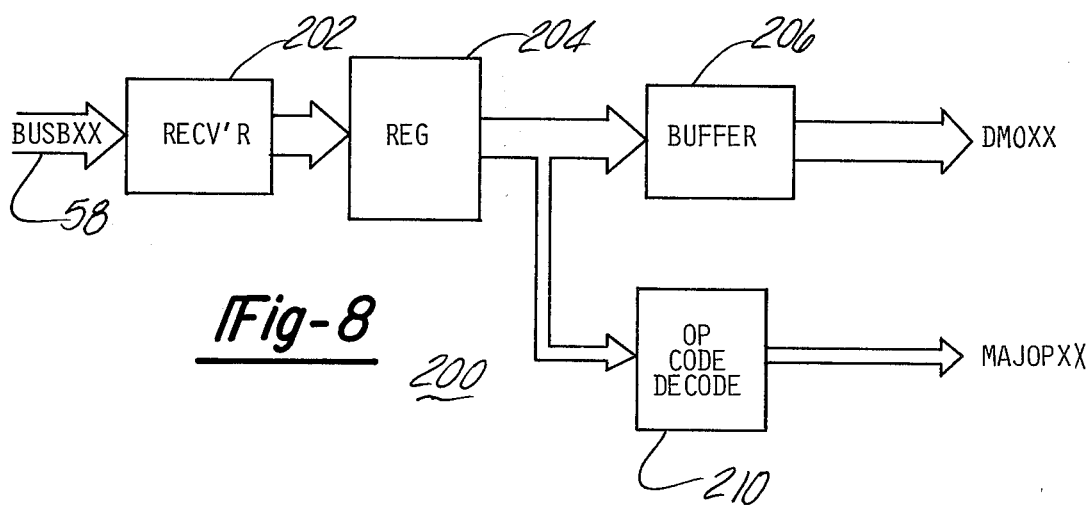
*Fig-8*

DOCUMENT SORTER APPARATUS

BACKGROUND OF THE INVENTION

1. Field of the Invention

This invention relates, in general, to document sorting apparatus and, more specifically, to a document sorting apparatus for sorting documents into a specific storage pocket according to data characters recorded on the face of the document.

2. Description of the Prior Art

Automatic data processing equipment normally used in banking institutions and the like typically includes a document reader-sorter which provides for the automatic reading of data characters recorded on the documents, such as bank checks, and for the automatic sorting of the documents into a specific one of a plurality of pockets according to the data recorded thereon. A stack of the documents is manually placed into a document hopper, from which individual documents are serially fed at high speed along a document transport guide way, past a data character read station, to a selected one of the document pockets. The machine reading of the data recorded on the individual documents is accomplished by means of MICR or OCR read heads disposed at the read station and sorting of the documents is generally accomplished automatically as a by-product of the machine reading function.

The data from the documents is inputed to a central processor which assigns a destination number to the documents specifying which pocket it is to be sorted into. This destination number is transferred to hard-wired electronic circuitry associated with each pocket location, which circuitry through document detectors recognizes the arrival of a document at its particular pocket. The circuitry then activates a gate mechanism to direct the document into the pocket or de-activates the gate so as to allow the document to pass downstream to its specified pocket.

Although such document reader-sorters have proven effective in achieving a document throughput rate of from 1500 to 2000 six inch documents per minute, they have been found to be relatively unreliable, especially with regard to a number of occurrences of document mis-sorts, where higher throughput rates are required; such increased document throughput rates being regarded as an essential goal in the development of future generation document reader-sorters.

Thus, it is desirable to provide a document sorting apparatus that will operate reliably at high document throughput rates. It is also desirable to provide a document sorting apparatus having the capability to control the sorting of documents into a specified one of a plurality of storage pockets at the desired higher document throughput rates. Finally, it is desirable to provide a document sorting apparatus which minimizes the number of occurrences of document mis-sorts.

SUMMARY OF THE INVENTION

There is disclosed herein a new and improved document sorting apparatus. The document sorting apparatus includes means for serially feeding documents along a transport guide way, past a read station, to a plurality of storage pockets. In the read station, data characters recorded on the face of the document are read and processed by a central processor which assigns a sequential tracking number as well as a destination number indicating which pocket the document is to be sorted in, to each document.

Sorter controller means, each associated with a predetermined number of the document storage pockets, are provided which are operative to control the deflecting or gate mechanisms of each pocket under its control. The sorter controller means is responsive to the destination and tracking number assigned to each document so as to direct each document into a specified pocket within its group of pockets or to pass the document downstream to the next group of storage pockets. The sorter controller comprises a single cycle processor which receives program instructions specifying document tracking functions from the central processor, which instructions are stored in a program memory. The sorter controller addresses the program memory and executes the program instructions fetched therefrom in order to generate electrical control commands useful in implementing the document tracking functions.

The use of a single sorter controller to control a group of pocket locations, which sorter controller executes each stored program instruction in a single clock cycle, provides higher document throughput rates than previously possible with prior art sorters utilizing hardwired electrical components to control each individual storage pocket. Furthermore, the document sorting apparatus of this invention minimizes the number of occurrences of mis-sorts of the documents by assigning a sequential tracking number and a pocket destination number to each document after it has been read; which tracking number and pocket destination number are used by the control program in each sorter controller to determine if the document is being sorted into the selected pocket.

BRIEF DESCRIPTION OF THE DRAWING

The various features, advantages and other uses of this invention will become more apparent by referring to the following detailed description and drawing, in which:

FIG. 6 is a block diagram of the arithmetic logic unit, accumulator and page address circuitry of the state machine controller shown in FIG. 2;

FIGS. 7A, 7B, 7C, 7D, 7E and 7F are flow charts depicting the sequence of operation of the state machine controller shown in FIG. 2;

FIG. 8 is a block diagram of the A-B command logic of the I/O control logic circuitry shown in FIG. 2;

FIGS. 11 and 12 are block diagrams of the A-bus control display logic circuitry of the I/O control logic circuitry shown in FIG. 2.

DESCRIPTION OF THE PREFERRED EMBODIMENT

Figure 1:
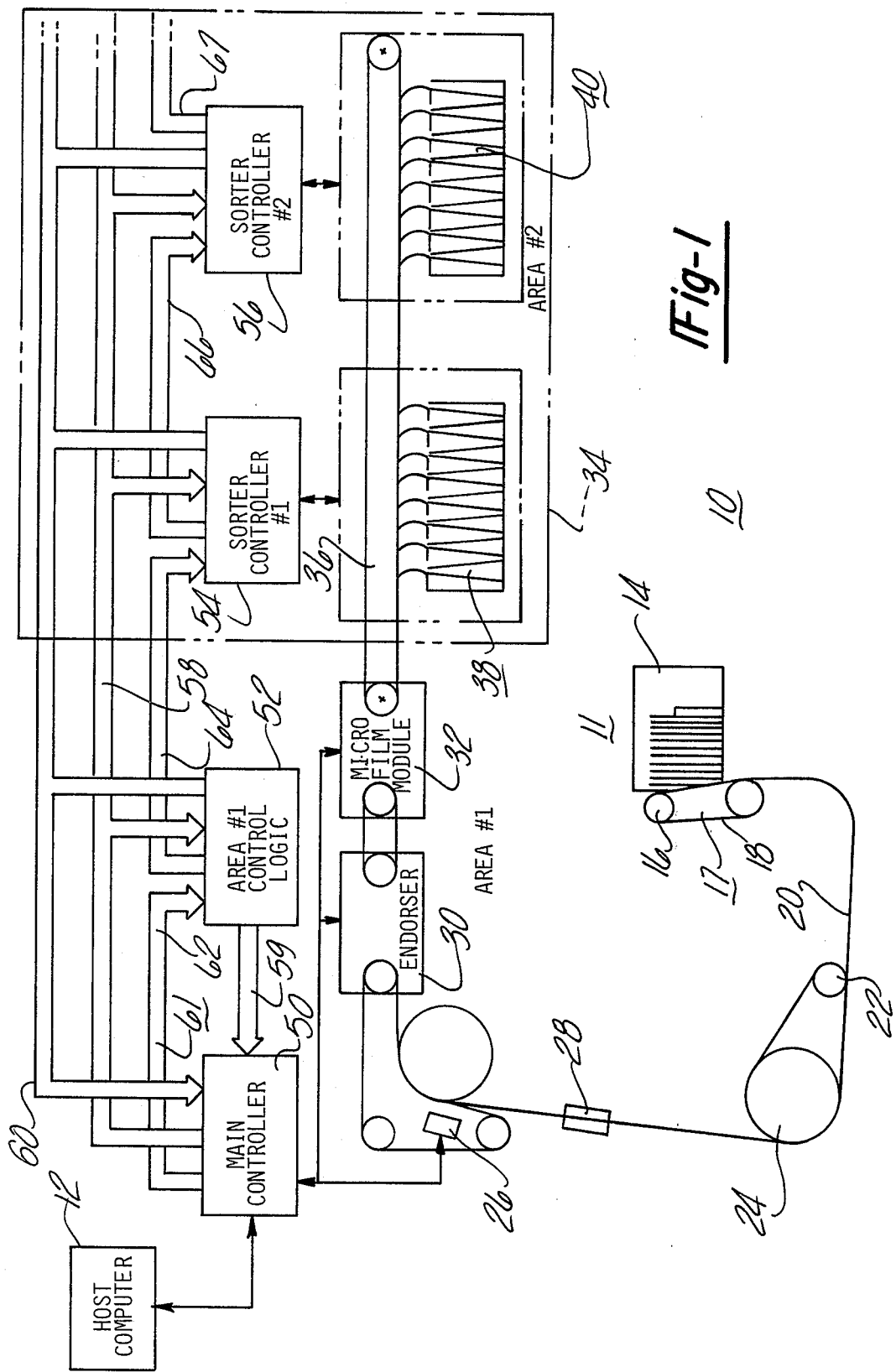
FIG. 1 is a block diagram of a document sorting apparatus constructed according to the teachings of this invention.

Throughout the following description, identical reference numbers are utilized to refer to the same component shown in all figures of the drawing.

Referring now to the drawing, and to FIG. 1 in particular, there shown a document sorting apparatus 10 constructed according to the teachings of this invention. The document sorting apparatus 10 is a high-speed document processing system capable of processing documents on-line when coupled to a central or host computer 12 or off-line through user defined programs. The document sorting apparatus 10 includes, in area #1, a feeder mechanism 11 comprising a hopper 14 wherein a plurality of documents, such as bank checks, are loaded. The feeder mechanism 11 further includes a feeder belt assembly consisting of a picking wheel 16 for picking the documents from the hopper one at a time and a feeder belt 18 which directs the documents along a transport guide way or track 20. As the documents proceed serially along the transport guide way 20, they encounter an accelerator 22 which increases the speed of the documents to the desired rate. Further along the transport guide way 20, an aligner drum 24 moves each document down against the track 20 so as to position each document on the track 20 such that the data characters recorded on the face of each document are correctly aligned with the read head in the read station 26. A double document detector 28 is also provided to detect double documents. The double document detector 28 includes two vacuum ports, not shown; one on each side of the transport guide way 20. As each document proceeds through the double document detector 28, the document will be drawn to one side of the detector thereby momentarily blocking one vacuum port. If only one vacuum port is closed at a given instant, only one document is present. If both vacuum ports are closed, indicative of two documents being present, a reject signal is generated which causes the two documents to be assigned to and deposited in the reject pocket of the sorting apparatus 10.

Proceeding past the double document detector station 28, each document enters the read station 26 wherein the data characters recorded on the face thereof are read. The read station 26 is of conventional design and, according to the preferred embodiment of this invention, comprises a MICR (magnetic ink character recognition) apparatus. Although a MICR apparatus is described, other character recognition systems, such as those employing optical character recognition (OCR) techniques could also be used. As is well known in the banking industry, characters formed of magnetizable ink are deposited on the face of each document indicating the amount of the check and various bank and depositor information. As the documents enter the read station 26, the ink is magnetized so as to be readable by the read head. Electrical signals are induced as the characters pass through the read head, which signals are sent to character recognition logic wherein it is converted to binary-coded data. As described hereafter, the binary-coded data is transferred to the main controller 50 wherein it is used to direct the document to a particular storage pocket location.

The sorter mechanism 10 may further include an endorser station 30, wherein each document is endorsed with various data, such as the bank legend, date, and batch number, through conventional printing apparatus, such as an ink jet printer. Next, the document enters an optional microfilm module 32 wherein a representation of the front and back surfaces of each document are captured on microfilm for record keeping purposes.

After leaving the microfilm module 32, each document enters the transport and pocket area 34, also referred to as area #2, of the document sorting apparatus 10. The transport mechanism includes motor driven transport belts 36 which run the length of the pocket mechanism 34 and transport the documents to the desired storage pocket. According to the teachings of this invention, the storage pockets are arranged in groups or modules, each controlled by a single sorter controller, as described in greater detail hereafter. Although each pocket module, such as modules 38 and 40, is illustrated as including eight individual pockets divided into two-four pocket sections, it will be understood that each module may include any other number of individual storage pockets as well.

As described in detail hereafter, the sorting of each document into a selected pocket location is accomplished by a document tracking program which selects the correct pocket after reading and interpreting the tracking information, indicative of the data recorded on the face of each document, which is received from the main controller 50. When a particular pocket is selected, the gate mechanism, associated with each pocket is opened and positioned in the document path such that the transport belt 36 guides the document into the selected pocket. If the pocket is not selected, the gate mechanism remains closed and forms a part of the document path or guide wall so as to direct the document downstream to subsequent pocket locations.

Throughout areas #1 and #2 of the document sorting apparatus 10, there are disposed a plurality of document detectors, not shown which detect the present location of each document. The document detectors are look-across, light beam interruption type devices wherein the light beam extending between the two elements of the document detector is broken by a document passing therebetween.

The controls needed to operate the above-described document sorting apparatus are provided by a main controller 50, area #1 control logic circuitry 52 and a plurality of sorter controllers, such as sorter controller #1 indicated by reference number 54, and sorter controller #12 indicated by reference number 56. The main controller 50 is a multi-processor unit which interfaces to a digital host computer 12 for on-line operations and, which further includes, a data storage input, such as from a floppy disk, for off-line operation. The main controller 50 receives the document sort program from the host computer 12 for on-line operation and from the data storage disk for off-line operation. Upon determining that a document is present in the read station 26, the main controller 50 assigns a sequential tracking number and a pocket destination number to the particular document. The main controller 50 further controls what is endorsed on each document as the documents pass through the endorser station 30 as well as what is to be microfilmed by the microfilm module 32. Mis-sorts protection is also provided by the main controller 50 which functions to check the tracking number associated with a particular document as it enters the pocket modules, such as pocket module 38, so as to determine that the proper document is about to be sorted. Finally, in response to a pocket entry report from a sorter controller, such as sorter controller 54 or 56, the main controller 50 determines that the document has reached and has been stored in its intended pocket.

The area #1 control logic circuitry 52 is comprised of hard-wired, electronic components which function to control the operation of the hopper 14 and feeder belt assembly 17. The area #1 control logic circuitry 52 also provides error detection by receiving a double document signal from the double document detector 28 and also by detecting underspaced, overspaced, and overlength documents. In performing the later functions, the area #1 control logic circuitry 52 measures the time elapsed as each document passes between two document detectors. The area #1 control logic circuitry 52 also serves to interface various control signals from the main controller 50 to the feeder belt assembly 17 and hopper 14. Furthermore, the destination and tracking number associated with each document is transferred from the main controller 50 to the sorter controllers by the area #1 control logic circuitry 52 through a daisy chain bus configuration, as indicated by data links 62, 64 and 66. The functions of the area #1 control logic circuitry 52 have been generally described to provide a better understanding of the document sorting apparatus 10. However, since the exact construction of the area #1 control logic circuitry 52 does not form a part of this invention and, further, can be easily implemented using known techniques and components, it will not be described in further detail.

As the documents leave area #1 of the document sorting apparatus 10 and enter the pocket modules or area #2, tracking of each document is provided by a plurality of consecutively disposed sorter controllers, such as sorter controllers 54 and 56. Each sorter controller, such as sorter controller 54, controls the operation of one pocket module, such as pocket module 38, which includes a pre-determined number, such as 8 in the preferred embodiment of this invention, of individual storage pockets. In addition, each sorter controller provides jam detection, undersized and underspaced document detection, controls the transfer of the documents within its particular pocket module and to the downstream pocket module, reports entry of the documents into a pocket within its own module, selects the specified pocket for document entry and reports various error conditions to the main controller 50.

Each sorter controller, such as sorter controller 54, is connected to the main controller 50 by control buses 58 and 60. The main controller 50 sends the document tracking program and various initializing commands to each sorter controller along control bus 58. Subsequently, each sorter controller reports the desired initializing values, such as the status of the document detectors, the automatic bias control values of each document detector and status reports and document entry information for each pocket within the module, to the main controller 50 via control bus 60. In addition, the destination and tracking numbers associated with each document are transferred to the area #1 control logic circuitry 52 and from there to each sorter controller, such as sorter controllers 54 and 56 via a document control bus 61 which is formed of individual data links, such as data links 62, 64, 66 and 67, arranged in a daisy chain configuration between the main controller 50, the area #1 control logic circuitry 52 and each sorter controller 54 and 56.

In operation, the area #1 control logic 52 requests pocket disposition information for each document from the main controller 50 on data bus 59. The main controller 50 will then respond by sending the pocket assignment number and the associated sequential tracking number to the area #1 control logic 52 via the document control bus 61 on data link 62. In turn, the area #1 control logic 52 will send the pocket assignment number and the tracking number to the first downstream sorter controller 54 via data bus 64. The control program, upon which sorter controller 54 is operating, will utilize this information for its eight pocket sort control functions. Pocket assignment information specifying a pocket number greater than the highest pocket number under the control of sorter controller 54 will be sent downstream by sorter controller 54 to sorter controller 56 via data bus 66 and from there on data bus 67 to the next downstream sorter controller which controls the operation of the specified pocket.

It should be noted at this point that although two sorter controllers 54 and 56, each individually controlling eight storage pockets, are illustrated in FIG. 1, additional numbers of sorter controllers similarly controlling a predetermined number of individual storage pockets may also be utilized within the teachings of this invention to expand the sorting capability of the document sorting apparatus 10.

Sorter Controller

Figure 2:
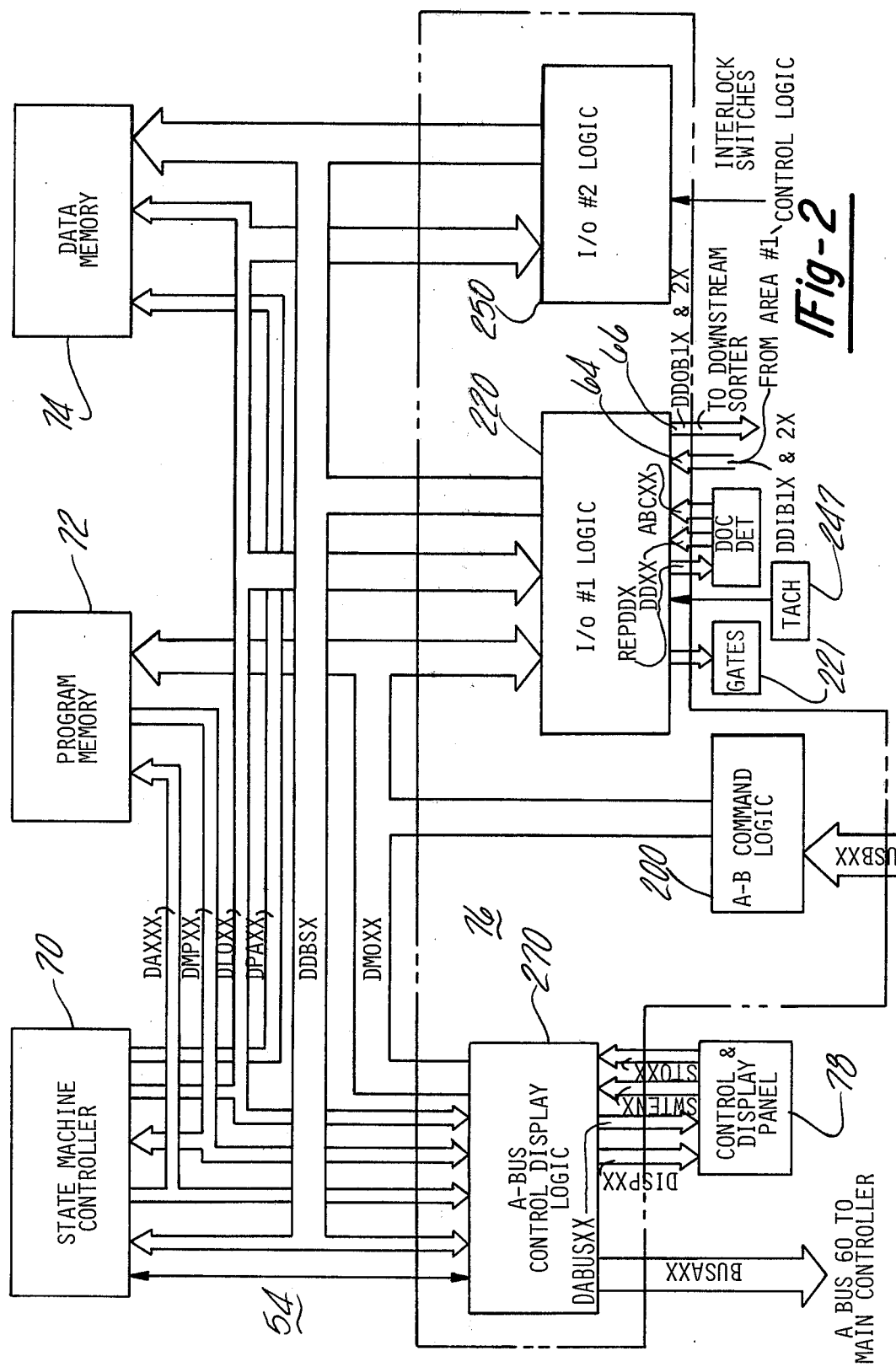
FIG. 2 is a block diagram of the sorter controller shown in FIG. 1.

Turning now to FIG. 2, there is shown a detailed block diagram of one of the identical sorter controllers, such as sorter controller 54. The sorter controller 54 includes a state machine controller 70, a program memory 72, a data memory 74, and I/O control logic section 76 and a control and display panel 78. In general, the state machine controller 70 comprises a programmable, stored program controller which controls the operation of the various components of the sorter controller 54. According to the teachings of this invention, the program memory 72 is formed of 2K words, each sixteen bits plus one parity bit long, of random access memory. The data memory 74 includes 3K bytes of eight bits plus one parity bit per byte of random access type memory. The data memory 74 is arranged in pages with sixteen bytes per page and a total of 192 pages. Page zero is utilized in the preferred embodiment of this invention as a scratch pad memory. The I/O control logic section 76, which is described in greater detail below, includes the necessary logic to interface the state machine controller 70, program memory 72 and data memory 74 with the control and display panel 78 as well as the document detectors, gate mechanisms, tachometer and various interlock switches associated with the pockets within its module. In addition, the I/O control logic section 76 interfaces the state machine controller 70 with the destination control bus 61 and the A and B buses 60 and 58, respectively. The control and display panel 78 includes a plurality of indicator lights and switch inputs which enables service personnel to display, alter and load various register and memory contents of the sorter controller 54.

State Machine Controller

In general, the state machine controller 70 is a single cycle processor which accesses the program instructions stored in the program memory 72 and decodes and executes each fetched instruction in one clock cycle. The program memory 72 of the state machine controller 70 receives the program instruction code specifying a particular document tracking sequence from the main controller 50 on the B bus 58. The instruction code is interpreted by the state machine controller 70 which utilizes it as a PROM address to access pre-stored ALU and logic control functions implemented within the state machine controller 70. The state machine controller 70 consists of instruction decode circuitry 100, program control logic 120 and an arithmetic control unit 180, as shown in FIGS. 3, 4, 5 and 6 and described in greater detail below. The program memory 72, data memory 74 and the I/O control section 76 are treated as peripherals to the state machine controller 70.

Functional Operation

Figure 3:
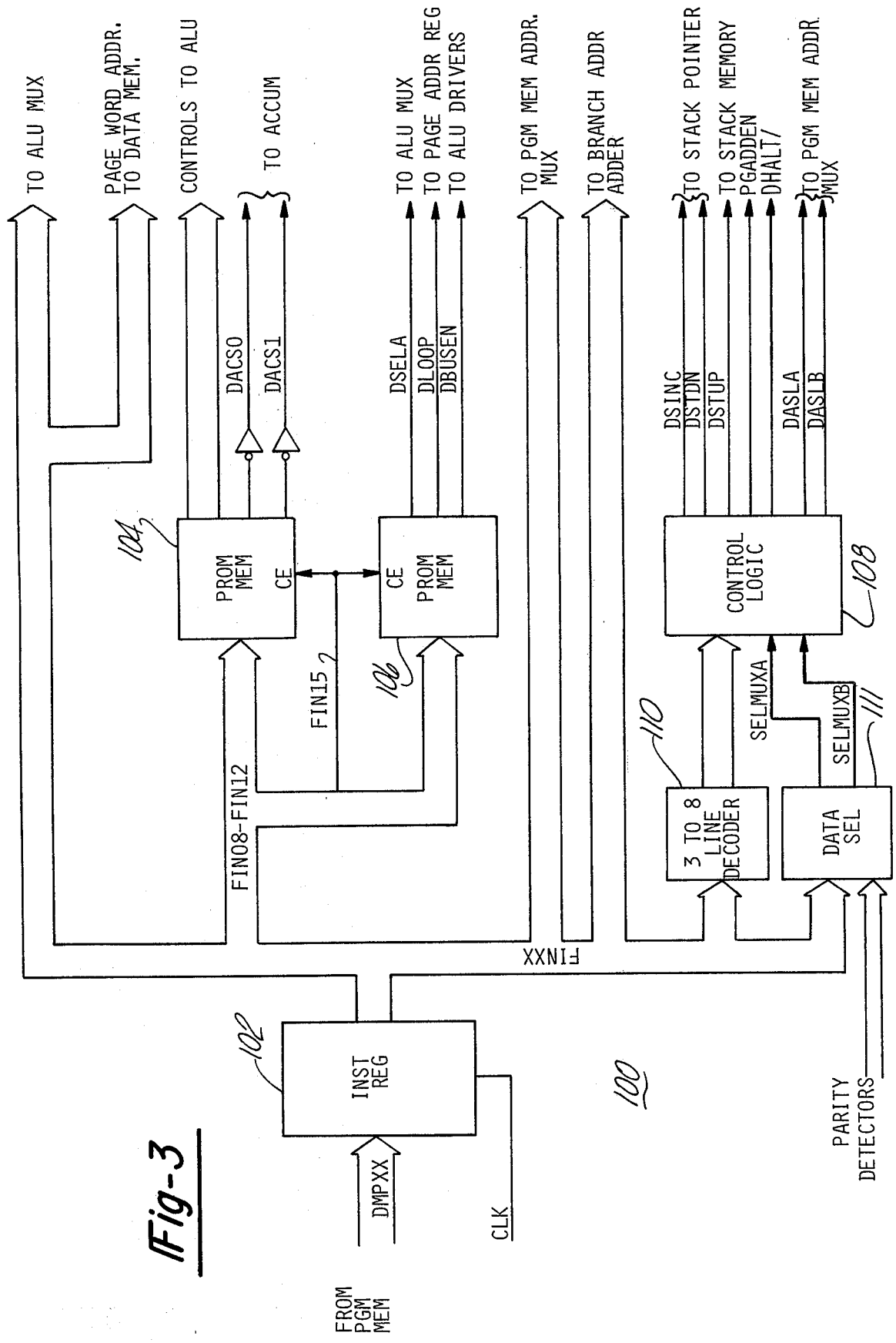
FIG. 3 is a block diagram of the instruction decode circuitry of the state machine controller shown in FIG. 2.

Referring now to FIG. 3, there is shown a detailed block diagram of the instruction decode circuitry 100 of the state machine controller 70. The instruction decode circuitry 100 includes an instruction register 102 which temporarily stores the sixteen bit program instruction word received from the program memory 72, labelled DMPxx and meaning DMPOO–DMPIS, after the positive edge of a true clock signal. Furthermore, as shown in FIG. 11 and described in detail hereafter, data from the control and display panel 78 switch register may also be on the DMPxx data bus input to the instruction register 102. The output of the instruction register 102, is a series of control signals labelled FINxx and meaning FIN00–FIN15. Selected bits of the instruction register 102 output, labelled FIN08–FIN12, are applied to the address inputs of first and second programmable read only memories (PROM's) 104 and 106, respectively, to access control commands stored in the PROM memories 104 and 106. Thus, the bit portions FIN08–FIN12 define the basic state machine controller program instruction MNEUMONICS and the PROM memories 104 and 106 contain the micro-code for various control logic functions.

Bits FIN08–FIN15 of the instruction word format, which constitute the operation code (OP CODE) of the program instruction words, as seen in the Appendix, Tables 1–5, are applied to a 3 to 8 line decoder 110 for further decoding and also to a data selector 111 to select certain of the parity detectors utilized on branch conditions. The output of the decoder 110 and the data selector 111 are inputs to the control logic circuitry 108 which provides additional control commands useful in controlling the operation of the state machine controller 70.

As will be described hereafter, the program memory 72 is addressed for each instruction by means of a program counter which is always pointing to the succeeding program memory location for accessing the next instruction. As shown in FIG. 3, the PROM's 104 and 106, the decoder 110 and the control logic 108 are immediately responsive to the instruction word OP CODE bits which are latched in the instruction register 102 during the first part of each clock cycle. In this manner the state machine controller 70 avoids separate instruction word fetch and decode cycles which increases the execution speed of the state machine controller 70 and enables it to implement document sorting functions at the rate required for high document throughput through the document sorting apparatus 10.

Figure 4:
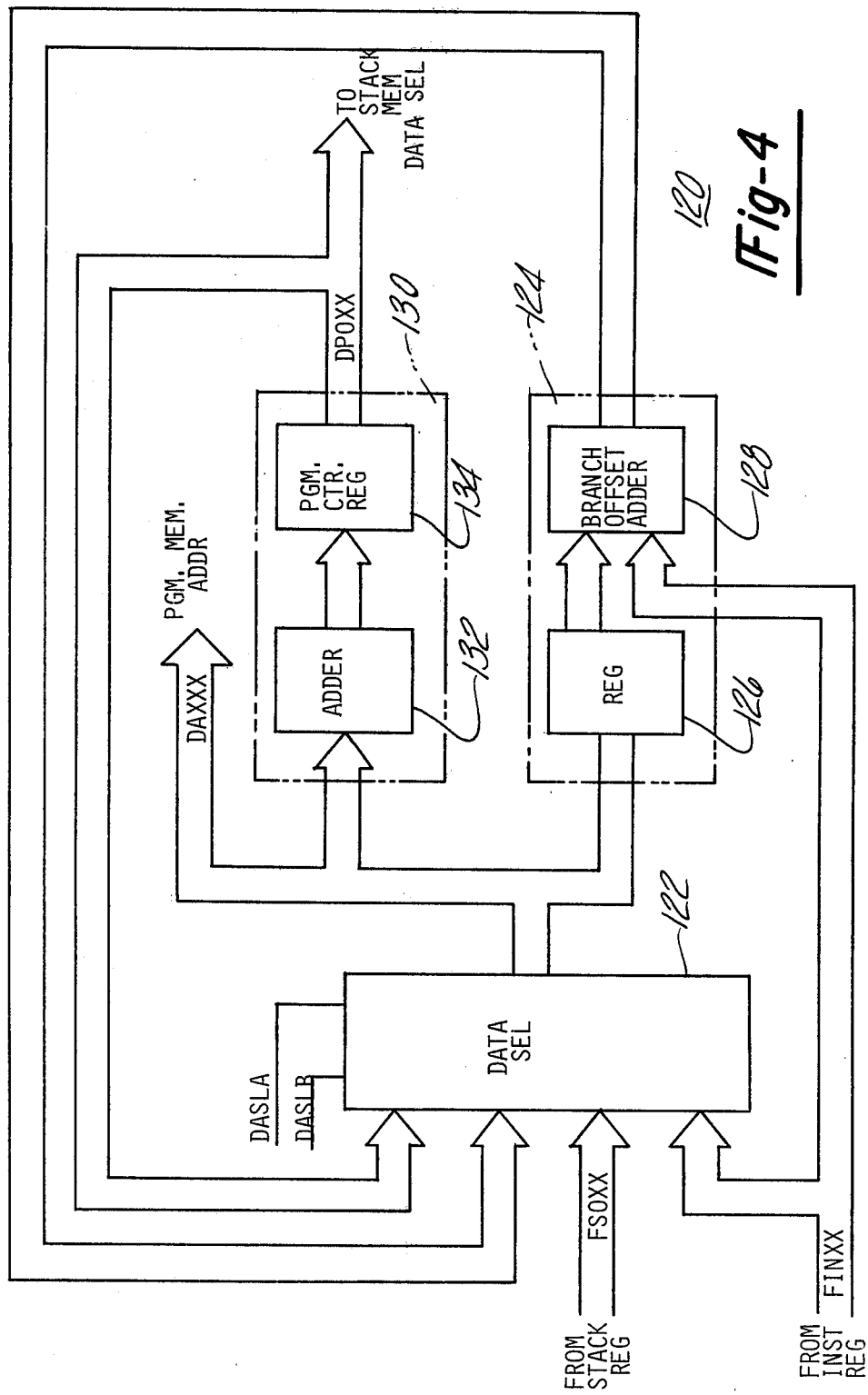
FIG. 4 is a block diagram of the program memory address circuitry of the state machine controller shown in FIG. 2.
Figure 5:
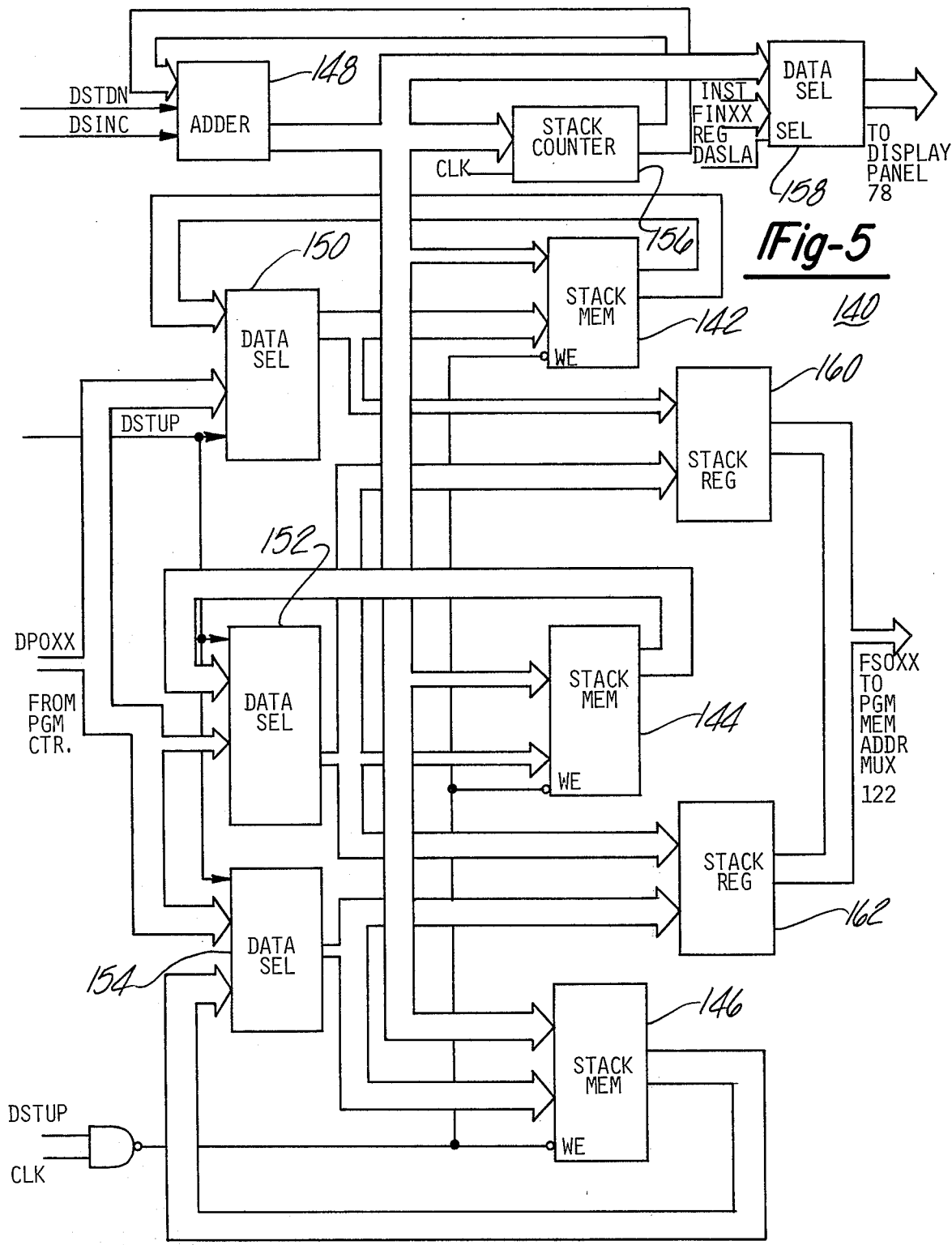
FIG. 5 is a block diagram of the stack memory circuitry of the state machine controller shown in FIG. 2.

Turning now to FIGS. 4 and 5, there is shown detailed block diagrams of the program control circuitry 120 of the state machine controller 70. As shown in FIG. 4, the program control circuitry 120 includes the program memory address data selector 122 whose purpose is to form the twelve bit program memory address. FIG. 4 depicts one of three identical 4 bit sections of the 12 bit program memory address; it being understood that three such circuits are needed to form the entire 12 bit address word. The program memory address data selector 122 receives inputs from the instruction register 102, labeled FINxx, directly from the operand of call or jump instructions, as described hereafter, from the stack memory, labeled FSOxx, during return instructions, as well as from the branch offset added 124 and the program counter 130. The inputs to the program memory address data selector 122 are selected by control signals labelled DASLA and DASLB from the control logic circuitry 108 shown in FIG. 3. As noted previously, the output of the program memory address data selector 122 is the program memory address, labelled DAxxx, which is used to fetch the next instruction word from the program memory 72. In addition, the program memory address data selector output is an input to the branch offset adder circuitry 124. This circuitry is selected with branch instructions and, if the branch conditions are satisfied, the branch operand (8 bits) are input to the branch offset adder 124 from the program memory address data selector 122. These eight bits, FIN0-0–FIN07, of the instruction word constitute the program memory address to which the program is to call, jump or branch. The output of the branch offset adder 124 thus becomes the new value of the program memory address.

The program memory address multiplexer 122 output is also input to the program counter 130 wherein it is incremented in adder 132 and register 134 to form the next program memory address. The program counter 130 can be incremented either by incrementing the adder 132 or the program counter register 134. The adder 132 is incremented by the DINCR signal which occurs during a conditional increment, such as during the execution of single step, load data from the display panel 78 or continue control commands. The program counter register 134 is incremented with the running clock at the end of each clock cycle. When the DINCR signal increments the adder 132, the data contained therein is loaded in parellel into the program counter register 134 and will constitute the current instruction address appearing at the output of the data selector 122.

Both the program counter register and the branch counter register 126 have their input data set at the end of the current clock cycle. Thus, the instruction to be executed during the following cycle will be accessed from the next succeeding location in the program memory 72. An exception to the incrementing of the program counter register occurs during the execution of a HALT instruction. The HALT instruction is executed in one clock cycle with the program counter register 134 being incremented at the end of that clock cycle. The actual HALT function of stopping the clock occurs at the end of one more clock cycle. Thus, the adder 132 is decremented so as to point to the correct memory location. The output of the program counter 130 is also an input to the stack memory data selector, on data lines labelled DPOxx, shown in FIG. 5.

There is shown in FIG. 5 the stack memory logic 140 of the program control circuitry 120 of the state machine controller 70. The stack memory logic 140 is selected by the program memory address data selector 122, FIG. 4, during the execution of return instructions. The program memory address is then changed to the current stack entry and the stack pointer decremented at the end of the current instruction until it is pointing to the next available stack entry. If the instruction is a call type instruction, as described hereafter, the stack memory logic 140 automatically stores the program counter 130 output, FIG. 4, in the stack so as to direct the program counter back to the instruction succeeding the original instruction.

Stack memory logic 140 includes stack memories 142, 144 and 146, each comprised of sixteen 4 bit random access memory elements so as to provide 16×12 bit words of data storage. The address to the stack memories 142, 144 and 146 is formed by the output of the stack pointer increment/decrement adder 148, stack counter 156 and data selectors 150, 152 and 154. The stack pointer adder 148 is incremented or decremented so as to point to the then available entry in the stack memory under the control of signals labeled DSTDN and DSINC, received from the control logic circuitry 108, shown in FIG. 3. The adder 148 is incremented or decremented according to the instruction requirements; i.e, return instructions or by means of the switches on the control and display panel 78. The stack counter 156 is incremented at the end of the current instruction clock cycle such that the stack counter 156 will contain the address of the next sequential stack location. In addition, the adder 148 is input to data selector 158 along with selected bits from the instruction register 102, labelled FINxx, which are selected by control signal DASLA, and used to display the contents of the stack pointer and instruction register on the display panel 78. The inputs to the data selectors 150, 152 and 154 include the output of their associated stack memory element 142, 144 and 146 and the output of the program counter 130, labeled DPOxx. These inputs are selected by control signal labeled DSTUP/, which is decoded by the control logic circuitry 108, FIG. 3. When the DSTUP/ signal is low, the output of the program counter 130 is selected through the data selectors and stack registers 160 and 162 for input to the program memory address multiplexer 122, FIG. 4. When control signal DSTUP/ is high, the stack memory 142, 144 and 146 output is selected through the data selectors 150. The stack memory output, which is the current stack location, is combined in stack registers 160 and 162 whose labelled FSOxx, is applied to the program memory address multiplexer 122, shown in FIG. 4.

Turning now to FIG. 6, there is shown a block diagram of the arithmetic control unit 180 of the state machine controller 70. For convenience, only one half of the circuitry forming the arithmetic control unit 180 is illustrated; it being understood that another circuit identical to that illustrated in FIG. 6 is utilized to form the eight bit data word utilized in the preferred embodiment of the arithmetic control circuitry. The arithmetic control unit 180 generates the data bus to the data memory 74 and the I/O control section 76 as well as providing the page address to the data memory 74. It controls the accumulator 188 input and output data and generates zero and carry flags. The arithmetic control unit 180 includes an arithmetic logic unit 182, such as one sold by Texas Instruments, model No. 74S181, or its equivalent. The input to the arithmetic logic unit 182 are the input select multiplexers 184 and 186. The inputs to multiplexer 184 include the outputs of the accumulator 188 and the page address register 190. The inputs to multiplexer 186 include the seven least significant output bits of the instruction register 102, shown in FIG. 3, which are labelled DL001-DLO64 after passing through inverters 185 and the current value of the data bus DDBSx. The input to multiplexer 184 is selected by control signal DSBLA which is decoded by PROM memory 106 in FIG. 3. The inputs to multiplexer 186 are selected by bit FIN13 from the instruction register 102. When bit FIN13 is a logic 0, the current value of the data bus DDBSx is selected. When bit FIN13 is a logic one, the output of the program memory 72, through the instruction register 102, is selected as an input to multiplexer 186. The seven least significant bits of the instruction word constitute the numeric literal value to be used in accumulator or page address register operations.

The outputs of multiplexers 184 and 186 are connected to inputs A and B, respectively, of the arithmetic logic unit 182. The arithmetic logic unit 182 in turn operates on the A and B input sources to produce 8 bit data words. The output of the arithmetic logic unit 182 is input to the accumulator 188 which provides a register for data manipulation. In addition, the output of the arithmetic logic unit 182 is connected as an input to the page address register 190 which latches the output of the arithmetic logic unit 182 and forms the page address for the data memory 74. Finally, the output of the arithmetic logic unit 182 is input to drivers 192 which are connected to the bi-directional data bus, labelled DDBx, which connects the state machine controller 70 with the data memory 74 and I/O control section 76.

The accumulator 188, used as a temporary storage register for data movement, receives the seven least significant bits, DL001-DLO64 of immediate, I/O memory and one-operand type instructions as shown in the Appendix, Tables 2-5. All data to the accumulator 188 and page address register 190 passes through the ALU 182, which acts as a pass through buffer or as an arithmetic unit. The specific operations for the ALU 182 are obtained from the decoding PROM memory 104, shown in FIG. 3. Again, it should be noted that all operations from instruction decoding to ALU operation to accumulator and page address register storage occur in one clock cycle with the updated information being stored in the accumulator 188 and page address register 190 at the end of the current clock cycle.

Operational Description

As described previously, the sixteen bit instruction words stored in the program memory 72 specify the document tracking functions to be performed by the state machine controller 70. There are two general types of instructions: control instructions which are used for call, jump, halt, branching and return operations of the state machine controller 70 and arithmetic logic unit instructions which are used by the arithmetic control unit logic 180 to manipulate data words involving the accumulator, I/O registers, memory data and page addresses. Referring now to the Appendix and to table 1 in particular, there is shown the various types and format of the control instructions utilized by the state machine controller 70. There are six basic types of control instructions: call, jump, halt, noop, return and conditional branch instructions. The call instruction causes the state machine controller to jump to the absolute address referenced by the operand of the instruction. It causes the next sequential address to be stored in the stack memory and increments the stack pointer. The jump instruction causes branching to the absolute address referenced by the operand. By using the call or jump instructions, any address in the program memory 72 can be selected. The halt instruction stops the execution of the state machine controller 70. This instruction has no operand. The noop instruction specifies no operation and also has no operand. The return instruction causes control to be passed to the address in the stack memory pointed to by the stack address register. In doing this, it decrements the stack pointer. The state machine controller 70 can branch conditional upon the value of ten branch addresses. The branch conditions are defined by control instruction word bits 8–11. The branch instructions BZT and BZF operate on the status of the ALU zero output signal; while branch instructions BCT and BCF operate on the status of the ALU carry output signal, thus providing the state machine controller 70 with ALU conditional branching capability. The address that can be branched to is relative to the branch instruction and can be up to 127 words ahead or 128 words behind the current location. The relative address is stored in two's complement form in the operand field of the branch instruction.

The arithmetic logic unit instructions that are used to manipulate data in the accumulator 188 and the page address register 190 are shown in tables two, three, four and five of the Appendix. The ALU instructions that require an operand to be specified are divided into four types, with each type using the same operations but with different operands. These type of ALU instructions include immediate instructions, I/O instructions, and data memory/scratch pad memory instructions, shown in tables two, three and four, respectively, of the Appendix. There is another group of ALU instructions that operate only on the accumulator 188 and the page address register 190 and do not use any of the four types of operands described above. This group includes the one operand instructions shown in table five of the appendix.

A brief description of the use and format of the ALU instructions will now be described. The immediate instructions, shown in table two of the Appendix, have, as their specified operand an eight bit literal. The implied operand of the literal field is the accumulator 188 or the page address register 190, shown in FIG. 6. The literal value is stored in the program memory as part of the instruction words and can be loaded into the accumulator or page register, or it can be used as a logical operational element of the accumulator 188. The specified operand of the I/O instructions, shown in table three, is one of the 127 I/O registers associated with the state machine controller 70. The I/O instructions are utilized to transfer data between one of the I/O registers and the accumulator 188 or the page address register 190. In the data memory instructions, listed in table four of the Appendix, the specified operand is a data memory address. In using these instructions, the page address register 190, shown in FIG. 6, must be pointing to the correct page in the data memory 74. Also shown in table four of the Appendix, are the various scratch pad memory instructions. The scratch pad memory is the first page of the data memory 74 and is made up of sixteen 8 bit bytes of data words. For these instructions, the page address register 190 is not used; with the specified operand of the scratch pad memory instructions being a scratch pad memory address. The four least significant bits of the program instructions define the byte locations within the scratch pad memory page. Finally, the one operand instructions, shown in table five of the appendix, operate on only the accumulator 188 or the page address register 190 and thereby provide additional flexibility for data manipulation.

Figure 7C:
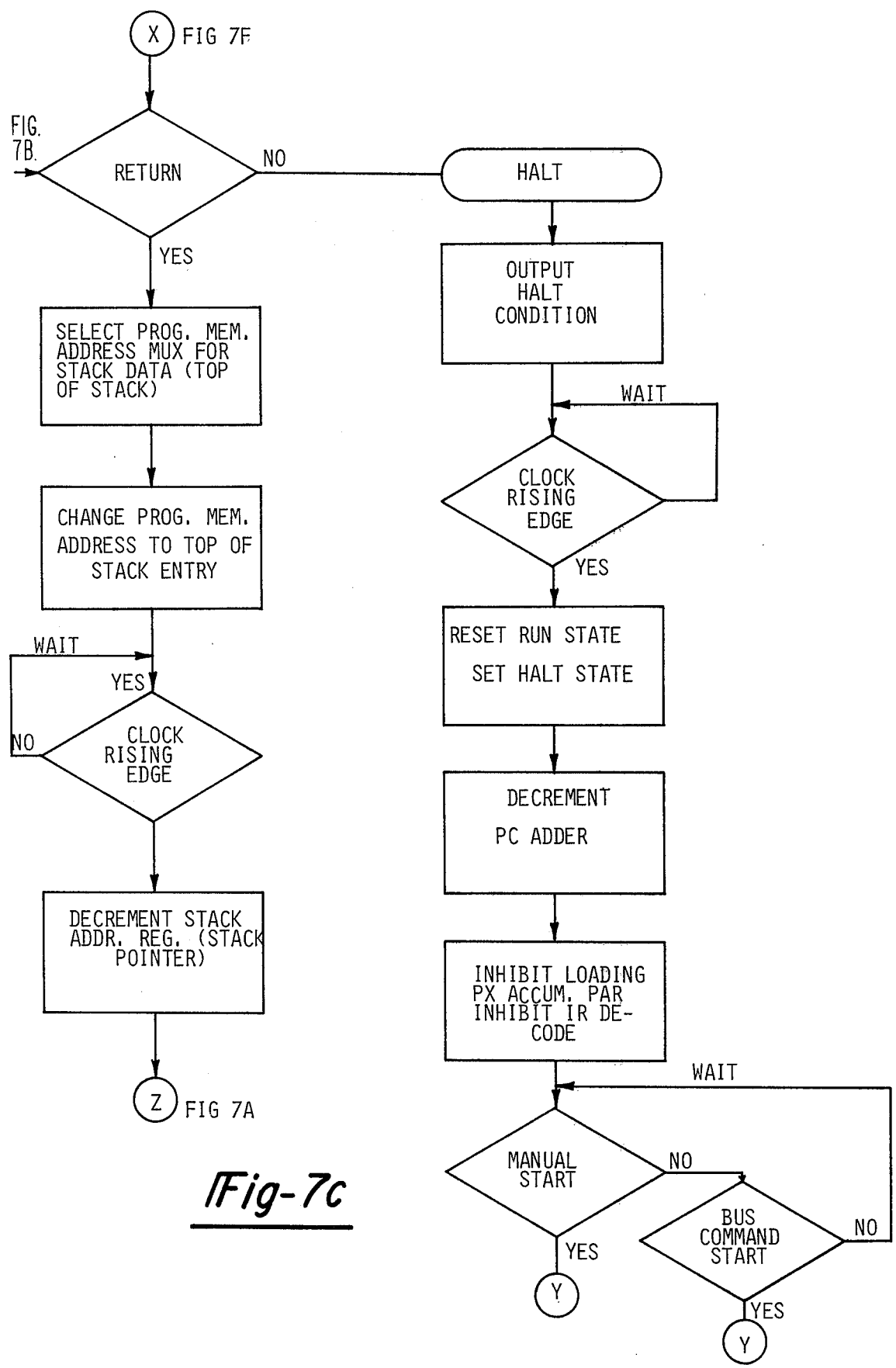
Figure 7D:
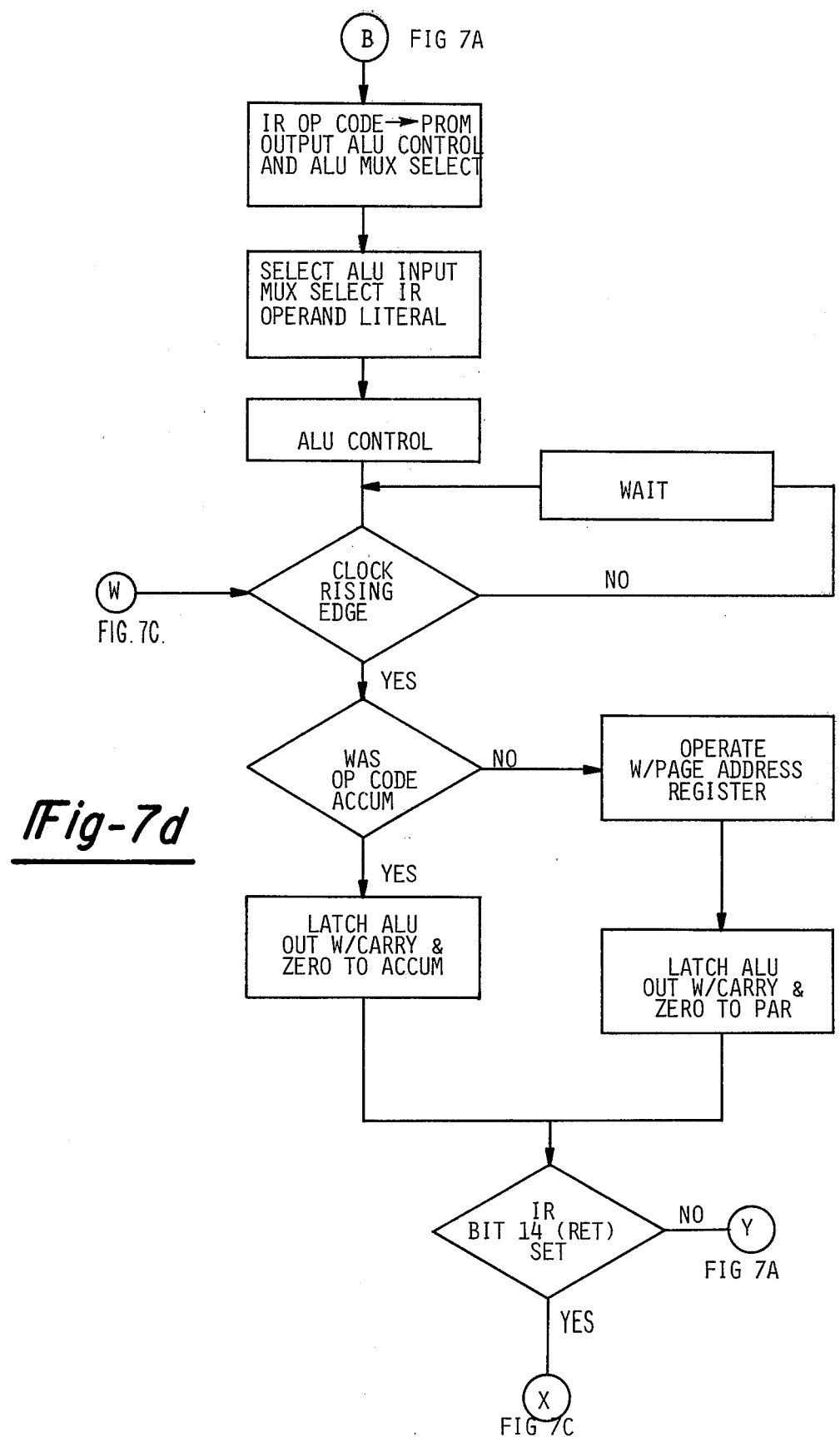

The use of the above described instruction set and circuitry of the state machine controller 70 will be more clearly understood by referring to the flow charts, shown in FIGS. 7A through 7F, which depict the operation of the state machine controller 70 and the flow of data and instruction words between various components of the state machine controller 70 during the implementation of document tracking functions. As shown in FIG. 7A, the first instruction is fetched from the program memory 72 and loaded into the instruction register 102. This instruction is decoded so as to determine which type of instruction, whether a control, immediate, I/O, scratch pad or data memory instruction, is to be implemented. If it is a control instruction, the instruction is further decoded, as shown in FIGS. 7B and 7C into one of the five types of control instructions: jump, call, branch, return or halt instruction. In the execution of each of these types of control instructions, the various registers of the state machine controller 70 are utilized to select the next program memory address and perform the necessary data manipulations. The sequence of operation within the state machine controller 70, when an immediate type instruction is decoded, is depicted in FIG. 7D. As shown therein, the immediate type instructions entail operations with the accumulator 188 or the page address register 190.

FIG. 7E depicts the sequence of operation when an I/O instruction is decoded by the state machine controller 70. In general, the I/O instructions transfer data between the various I/O registers and either the accumulator 188 or the page address register 190. Referring now to FIG. 7E, the sequence of data manipulation within the state machine controller 70, when a scratch pad or data memory instruction is decoded, is depicted. With these types of instructions, data from the accumulator 188 or the page address register 190 is transferred to or from the scratch pad portion of the data memory 74 or the remaining pages of the data memory 74.

I/O Control Logic

Referring again to FIG. 2, there is shown another major element of the state machine controller 70, namely the I/O control logic section 76. The I/O control logic section 76 interfaces the state machine controller 70, the program memory 72 and the data memory 74 to the main controller 50, the area #1 control logic section 52, the upstream and downstream sorter controllers and the peripheral devices associated with the pocket mechanisms under the control of each sorter controller. The major control blocks of the I/O control logic section 76 include the A-B command logic circuitry 200, the I/O #1 logic circuitry 220, the I/O #2 logic circuitry 250 and the A-Bus control display logic circuitry 270.

Turning now to FIG. 8, there is shown a detailed block diagram of the A-B command logic circuitry 200. This circuitry decodes commands received from the main controller 50 on the B-Bus 58. In decoding these commands, the A-B command logic 200 transfers the program instructions to the program memory 72 or requests the status of the various document detectors and the automatic bias control (ABC) values of the document detectors from the I/O #1 logic circuitry 220. As shown in FIG. 8, data information representing program instructions is received from the main controller 50 on the B-Bus 58 data lines, labelled BUSBxx, by receivers 202. Each program word is stored in register 204 before being sent to buffer 206 for transmission to the program memory 72 on the data bus DMOxx. In addition, the program word received from the main controller 50 is decoded in op code decoder 210 in order to generate control signals, defined by the major op codes, MAJOPxx, utilized by the various components of the sorter controller 54.

Figure 9:
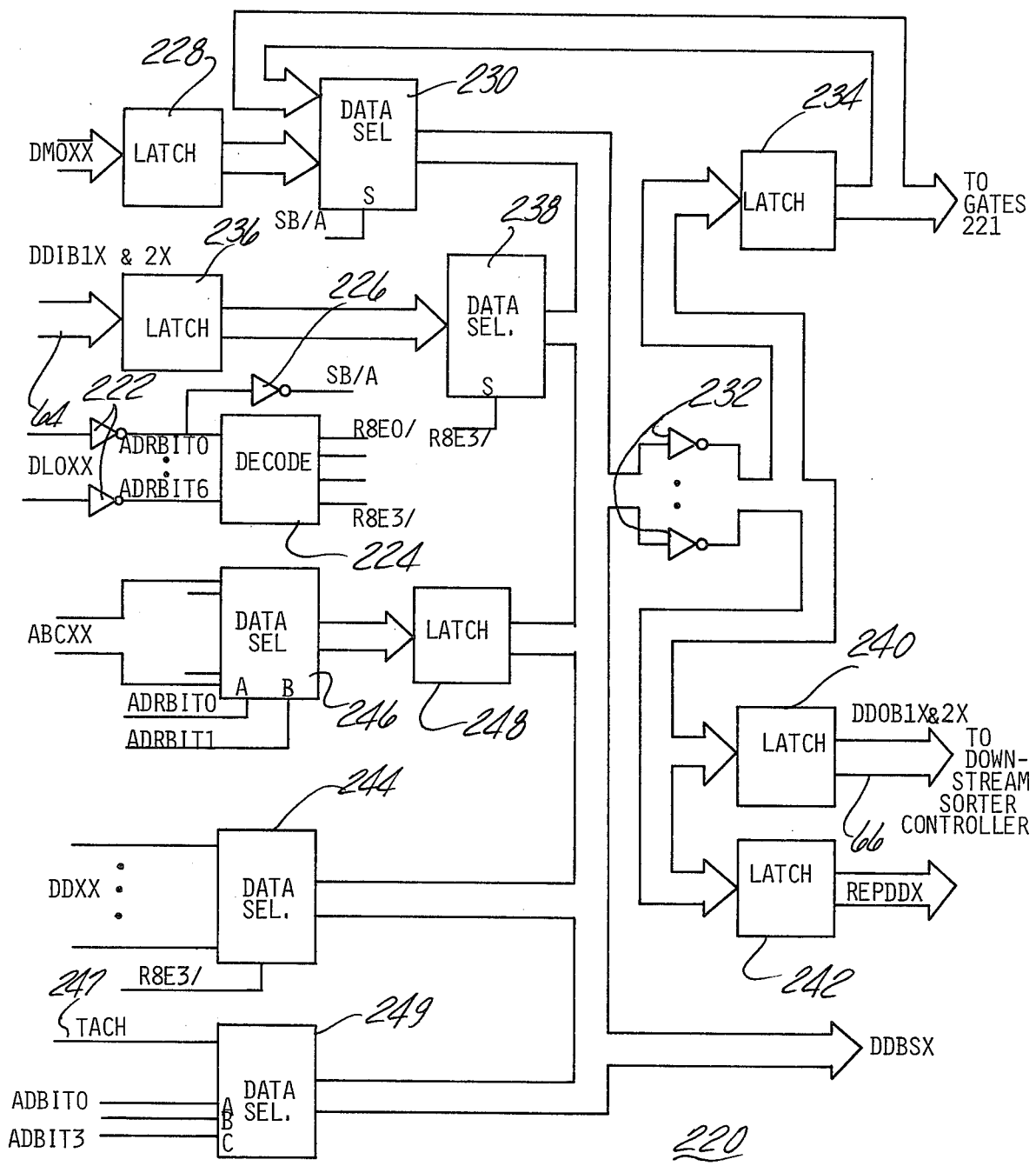
FIG. 9 is a block diagram of the I/0 #1 logic of the I/O control logic circuit shown in FIG. 2.

Referring now to FIG. 9, there is shown a detailed block diagram of the I/O #1 logic circuitry 220. This circuitry interfaces the state machine controller 54 with the destination control bus 61 and the various gates and document detectors within the module controlled by each particular sorter controller, such as sorter controller 54. The output of the I/O #1 logic circuitry 220 is connected to the data memory data bus, labelled DDBSx, which connects the state machine controller 70, the data memory 74 and the I/O control section 76. The I/O output from the state machine controller 70, on data lines DLOxx, is input to a plurality of inverters 222, the output of which is a plurality of signals, labelled ADRBIT0-ADRBIT6, which are utilized as address bits. As the input lines DLOxx, contain the address field of the I/O instructions. The address bits ADRBIT-0-ADRBIT6 are further decoded by decoding logic 224 to access output port registers with which the state machine controller 70 can deposit single or multi-bit information.

Command signals from the main controller 50 requesting the status of the various document detectors and gates are input to the I/O #1 logic 220 from the A-B command logic 200, FIG. 8, on control lines DMOxx to latch register 228. The output of the register 228 is one of the inputs to a data selector 230, the other input of which is the status of the gates, as described below. One of these inputs to the data selector 230 is selected by control signal SB/A which is the output of inverter 226 from the decoded DLOxx input signals. In this manner, the state machine control program addresses the I/O part by sampling the open or closed status of the pocket gate under its control. When data selector 230 selects the contents of latch 234, the information is placed on the DDBSx bus for input to the data memory 74. In addition, the state machine controller 70 may change the state of the gate mechanisms 221 by placing an appropriate control signal on data lines DMOxx, which is selected through data selector 230, inverted in inverters 232 and latched in latch register 234 before being transferred to the gate mechanisms 221.

The I/O #1 logic circuitry also interfaces the state machine controller 70 with the destination code bus from the upstream sorter controller or the area #1 control logic 52 and the downstream sorter controller, such as sorter controller 56 in FIG. 1. The input from the upstream destination control bus, labelled DDIB1x and 2x on data bus 64 and which contains the destination and tracking numbers associated with a document, is input to latch register 236, FIG. 9, the output of which is an input to data selector 238. The output of the data selector 238 is placed on the data bus labelled DDBSx, by means of an I/O port address, such that the destination and tracking information is transferred to the data memory 74 to be utilized by the state machine controller 70. Further, the state machine controller 70 may transfer the destination and tracking information from the data memory 74 onto the data bus labelled DDBSx which, through inverters 232 and latch 240 is transferred on data bus DD0B1x and 2x, reference number 66, to the downstream sorter controller, such as sorter controller 56 in FIG. 1. Since data movement in the state machine is in 8 bit bytes (bit parallel, byte serial), the information is output to multi-bit ports in 8 bit bytes or less. Thus, the designation DDOB1x and 2x, respectively, refers to the first and second 8 bit bytes.

In performing its document tracking functions, the state machine controller 70 utilizes the inputs from the various document detectors within its module to determine the present location of documents being transported through its particular pocket module. As described in detail hereafter, there are three document detectors per storage pocket. In order to determine the status of the document detectors, that is, whether covered or uncovered by documents, the state machine controller 70 will place an I/O port address on the DLOxx data lines. The decoded address control signal from decoder 224 will cause the status, either covered or uncovered, of the document detectors to be placed on the bi-directional data bus for input to the data memory 74. As shown in FIG. 9, the document detector data, DDxx, is selected by control signal R8E3/ in data selector 244. In addition, the document detectors have automatic bias control (ABC) circuitry associated therewith which is an indication of the conductivity of the light sensitive transistor in the document detector. This automatic bias control value is input to a data selector 246 and latch 248. In this manner, the ABC values of each document detector within a pocket module may be placed on the data bus, labelled DDBSx, and transferred to the state machine controller 70. Data selector 249 is addressed with specific I/O address values which cause information concerning the status of the transport motor tachometer (pulse interval) and motor up-to-speed status to be input to data bus DDBSx for transmission to the data memory 74.

Figure 10:
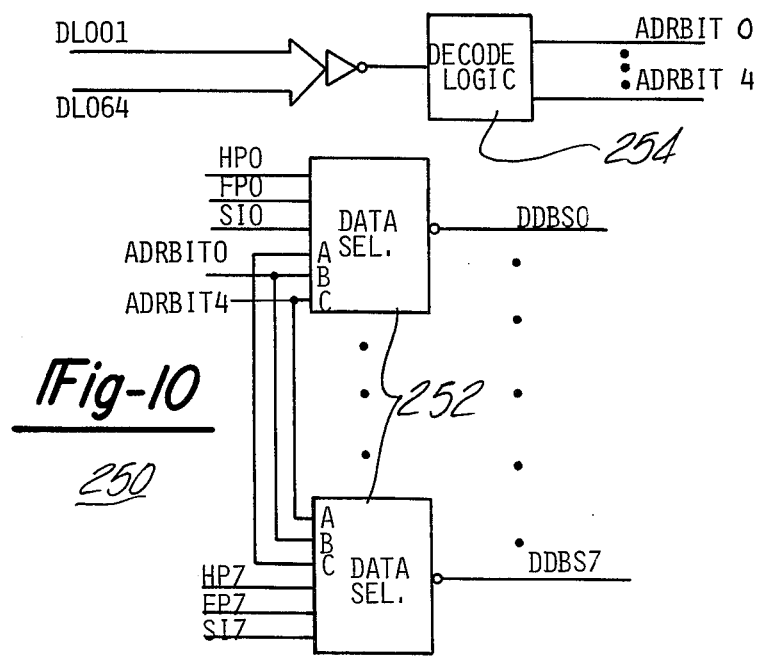
FIG. 10 is a block diagram of the I/O #2 logic circuitry of the I/O control logic circuitry shown in FIG. 2.

Referring now to FIG. 10, there is shown a detailed block diagram of the I/O #2 logic circuitry 250. The purpose of this circuitry is to interface the state machine controller 70 with the various interlock and full pocket switches dispersed throughout the pocket module. These switches provide indications within each pocket of whether the pocket is full or half full with documents, as well as whether the pocket is in the open or closed position. The full, half full and switch interlock signals are input to a plurality of data selectors 252, selected by I/O port addresses and placed on a data bus labelled DDBS0-DDBS7 for transfer to the data memory 74. Which switch input is selected is determined by select inputs labelled ADRBIT0-4 which are decoded by decode logic 254 from the I/O register input, labelled DLO01/-DLO64/ from the state machine controller 70.

Figure 12:
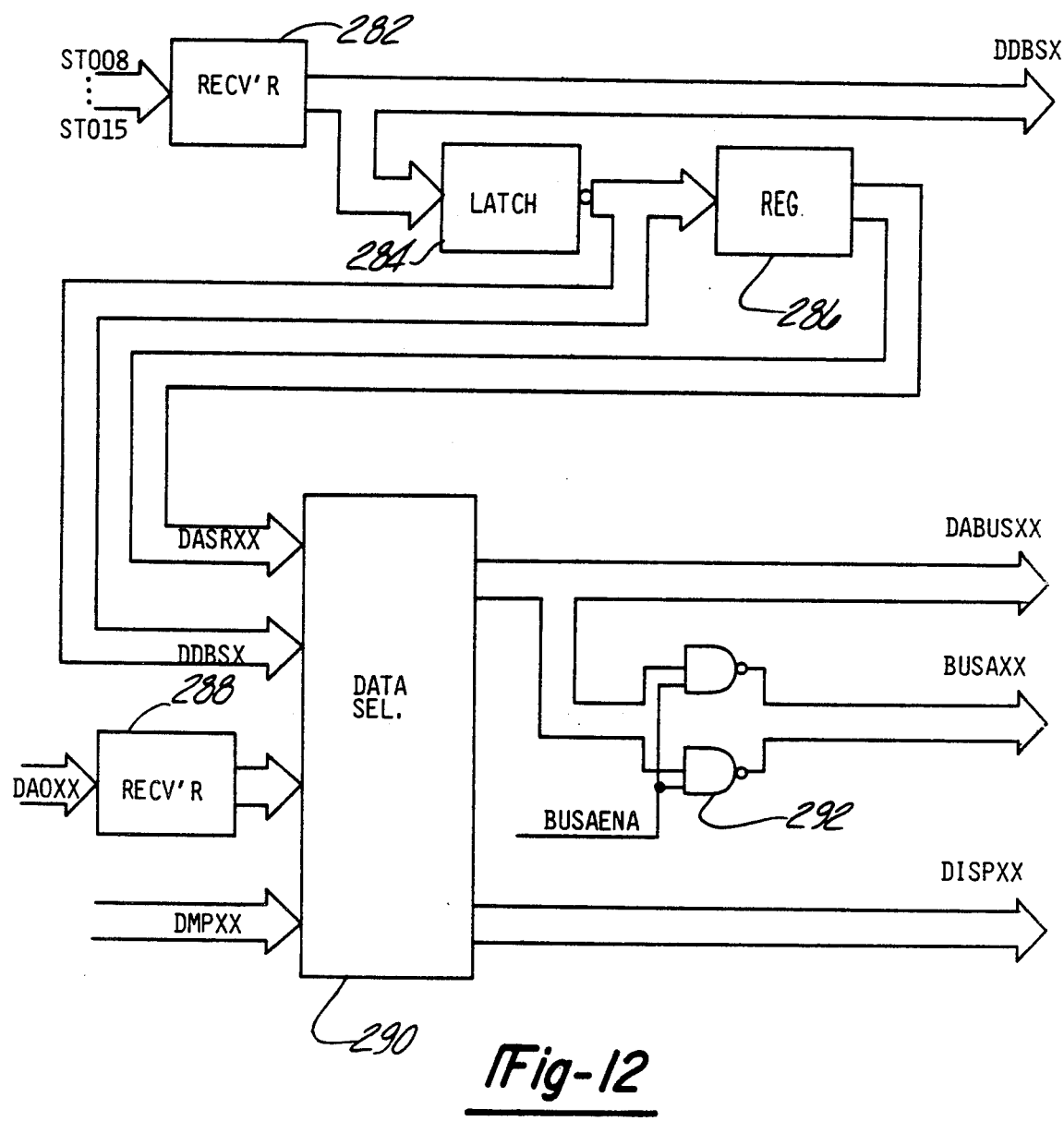

Turning now to FIGS. 11 and 12, there are shown detailed block diagrams of the A-bus control display logic 270. In general, this circuitry interfaces the state machine controller 70 via the A-bus 60 to the main controller 50 and also to the control and display panel 78. The control and display panel 78 includes 16 toggle switches, not shown, which enable service personnel to load various registers within the sorter controller 54 with data and program information. Which register within the sorter controller 54 is selected is determined by the output of a multiposition selector switch, labelled SWTENX on the display panel 78. The output of the various toggle switches, labelled STO00–STO15, are input to receivers 272 and 274. The output of the receivers 272 and 274 are connected to the data bus labelled DMO00–DMO15 as well as to latches 276 and 278. The output of the latches 276 and 278 are connected to a data bus labelled DMP00–DMP15 as well as to data selector 290, shown in FIG. 12. The output of the selector switch, labelled SWTENx, is decoded in decoder 280, FIG. 11, which includes a PROM memory, and placed on the DMOxx and DMPxx data buses.

As shown in FIG. 12, certain of the toggle switches, labelled STO08–STO15, are input to receivers 282 and placed on data bus DDBSx to the data memory 74. The output of the receivers 282 is input to latch register 284, the output of which, labelled DDBSx, is input to the data selector 290. The output of latch 284 is also input to a tri-state register 286 which provides another input to the data selector 290, labelled DASRxx. The program memory address DAOxx generated by the state machine controller 70 is also input to the data selector 290 through receiver 288. The final input to the data selector 290 includes data lines labelled DMPxx from the latches 276 and 278, shown in FIG. 11. The input to the data selector 290 is selected by appropriate select circuitry, not shown, such that the output from the data selector 290 may, through NAND gates 292, be placed on the A-bus 60, labelled BUSAxx, and sent to the main controller 50. The other outputs from the data selector 290 are placed on data busses DABUSxx and DISPxx to the control and display panel 78 so as to display therein the present output of the stack memory, shown in FIG. 5, and the register selected by the selector switch on the display panel 78, respectively.

Application

Figure 13:
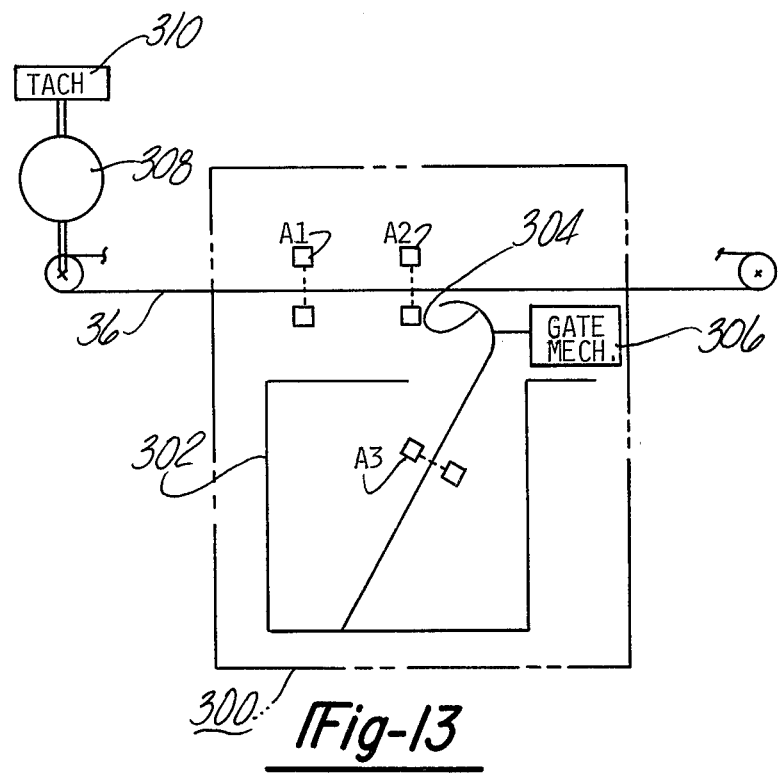
FIG. 13 is a pictorial representation of one of the individual storage pocket locations of the document sorting apparatus shown in FIG. 1.

The use and operation of the sorter controller, such as sorter controller 54, in tracking and directing a document into a selected pocket will now be described in conjunction with FIG. 13. There is shown in FIG. 13 one pocket mechanism 300 of the plurality of pocket mechanisms within the pocket module 38 controlled by the sorter controller 54, as shown in FIG. 1. The pocket 300 includes a document storage portion 302, a switchable gate 304 controlled by a gate control mechanism 306 and three document detectors, labelled A1, A2 and A3. A portion of the transport belt 36 extending through the pocket module 38 is shown along with its driving motor 308. A tachometer 310 is associated with the pocket module 38 and is connected to the driving motor 308 so as to output a pulse for a predetermined number of revolutions of the drive motor 308, which is thereby related to the distance the document travels.

In implementing its document tracking functions, the sorter controller 54, tracks the documents through its pocket module 38 by comparing the position of the document to its electronic record at key points throughout the document's travel path. The sorter controller 54 further opens or closes the gate 304 on a selected pocket so as to divert the document into a preselected one of the pockets within its pocket module 38. Finally, the sorter controller 54 detects and reports jam conditions, such as too small or too long a time interval between documents appearing at consecutive document detectors, as well as the status of the document detectors, initial ABC values, and where the document is located when a document missort is detected. Regarding the detection of a document at a particular pocket, such as pocket 300 shown in FIG. 13, the detection depends upon if the document is expected at a particular document detector within the pocket module. A document is detected if it has a tracking number associated with it and it arrives at the document detector within a predetermined period of time, hereafter referred to as its window. When a zone receives a tracking number for a document, it indicates that the previous zone or pocket within the pocket module has recognized the document and that it is to arrive at the zone, such as zone 300, within its predetermined window. The window is defined as the time between the earliest and latest possible arrival of the document at a particular document detector. This time is indicated by a predetermined number of tach pulses.

In implementing the document tracking function, the sorter controller 54 utilizes three timers associated with each document detector, such as document detectors A1, A2, and A3, within each pocket zone. The first timer is for the document window and generally is the time period from the leading edge of the document arriving at the previous document detector to the time the leading edge of the document arrives at the document detector in question. The second timer is utilized to measure the underspace condition or the amount of space between two successive documents and is measured from the trailing edge of one document to the leading edge of the next document. The final timer is the overlength timer and is an indication of the length of time a document detector is covered by a document.

In order to clarify the understanding of the document tracking functions of the sorter controller of this invention, the progress of a document past a pocket, such as pocket 300 in FIG. 13, will be described. For convenience, it will be assumed that the document arrives at each document detector within its time window, it is not an overlength document, it is not underspaced and it arrives with a tracking number assigned to it. Initially the leading edge of the document will trigger document detector A1. At this time, the state machine controller 70 will initiate and start the overlength timer for the A1 document detector, stop the A1 document window timer which had been initiated when the document was at the A2 document detector of the previous pocket, initiate and start the A2 window timer and signal the previous A3 document detector that the document has arrived at pocket 300. The document will continue along the transport guideway 36 until the leading edge of the document breaks the light beam of the A2 document detector. The state machine controller 70 will then stop the A2 document window timer, initiate and start the next A1 and A3 window timers, initiate and start the A2 overlength timer and open or close the gate 304 depending upon the pocket destination number received from the previous zone. When the trailing edge of the document uncovers the A1 document detector, the A1 overlength timer will be stopped.

Assuming that the pocket destination number associated with the document indicates that the document is to be stored in pocket 300, gate 304 will have been opened so as to divert the document into pocket 300. When the leading edge of the document breaks the beam of light of the A3 document detector, the state machine controller 70 will initiate and start the A3 overlength timer and stop the A3 window timer. When the trailing edge of the document uncovers the A3 document detector, the A3 overlength timer will be stopped and the state machine controller 70 will send the disposition record of the document to the main controller 50 which then checks that the document has been sorted into the proper pocket.

If the document is intended for a downstream pocket, the gate 304 will remain closed and the document will then break the A1 document detector of the next pocket. At this time, the state machine controller 70 will initiate and start the A1 document detector of the next zone, stop the A3 document window timer, reset the signal to the previous A3 detector generated above and signal the main controller 50 that it is not the last disposition for the particular document.

If any of the overlength or window timers times out before the document has arrived at the particular detector in question, the state machine controller 70 will report a jam condition to the main controller 50 which will then stop the sorting function. In particular, if an underspace condition is detected at the A2 document detector indicating that the spacing between two documents is below the minimum specified, the state machine controller 70 will not operate gate 304 since there will not be enough time to open the gate 304 before the document reaches the position of the gate 304.

There has been disclosed herein a new and improved document sorting apparatus. The document sorting apparatus of this invention includes sorter controller means, each associated with a predetermined number of the document storage pockets. The sorter controller means are operative to control the gate mechanisms of each pocket and are responsive to pocket destination and tracking numbers received from a main processor so as to direct a document into the specified pocket within its group of pockets. The sorter controller means comprise a single cycle processor which receives program instructions specifying document tracking functions from the central processor which are stored in a program memory. The sorter controller address the program memory and executes the program instructions fetched therefrom in order to generate electrical control signals useful in implementing the document tracking functions. The use of a single sorter controller for controlling a group document storage of pockets, which controller executes program instructions in a single clock cycle, provides higher document throughput rates than previously possible utilizing prior art document sorters.

APPENDIX

TABLE 1

| | | CONTROL INSTRUCTIONS | | | |
|---|---|---|---|---|---|
| | | BINARY | | | |
| MNEMONIC | | 1111 11 | | | |
| OPERAND | | 5432 1098 | 7654 | 3210 | USE |
| CALL | AA | 1000 AAAA | AAAA | AAAA | JUMP AND STORE LOC. CTR. |
| JUMP | AA | 1010 AAAA | AAAA | AAAA | JUMP TO A |
| HALT | | 1111 0100 | 0000 | 0000 | STOP EXECUTION |
| NOOP | | 0000 0000 | 0000 | 0000 | NO OPERTAION |
| RETN | | 0100 0000 | 0000 | 0000 | RETURN FROM SUBROUTINE |
| BZT | RA | 1101 0000 | RRRR | RRRR | BRANCH ON ZERO TRUE |
| BZF | RA | 1100 0000 | RRRR | RRRR | BRANCH ON ZERO FALSE |
| BOF | RA | 1100 0000 | RRRR | RRRR | BRANCH ON BIT 0 FALSE |
| BOT | RA | 1101 0000 | RRRR | RRRR | BRANCH ON BIT 0 TRUE |
| . | | | | | |
| . | | | | | |
| . | | | | | |
| BFF | RA | 1100 1111 | RRRR | RRRR | BRANCH ON BIT F FALSE |
| BFT | RA | 1101 1111 | RRRR | RRRR | BRANCH ON BIT F TRUE |

A — ABSOLUTE 12 BIT ADDRESS
R — RELATIVE 8 BIT 2's COMPLEMENT ADDRESS
RA — OPERAND REPRESENTING A PROGRAM MEMORY ADDRESS; CONVERSION TO RELATIVE ADDRESS DONE BY ASSEMBLER
AA — OPERAND REPRESENTING A PROGRAM MEMORY ADDRESS

| 15 14 13 12 | 11 10 9 8 | 7 6 5 4 3 2 1 0 |
|---|---|---|
| 1 OP CODE | BRANCH CONDITION SELECT | RELATIVE ADDRESS BRANCH |
| | ABSOLUTE ADDRESS | JUMP OR CALL |

TABLE 2

| | | IMMEDIATE INSTRUCTIONS | | | |
|---|---|---|---|---|---|
| | | BINARY | | | |
| MNEMONIC | | 111 111 | | | |
| OPERAND | | 543 21098 | 7654 | 3210 | USE |
| LDAI | L | 0R1 00101 | LLLL | LLLL | LOAD LITERAL TO ACCUM |
| LDPI | L | 0R1 00110 | LLLL | LLLL | LOAD LITERAI TO PAR |
| ANDI | L | 0R1 00010 | LLLL | LLLL | AND LITERAL TO ACCUM |
| ORI | L | 0R1 00011 | LLLL | LLLL | OR LITERAL TO ACCUM |
| XORI | L | 0R1 00100 | LLLL | LLLL | XOR LITERAL TO ACCUM |
| ADDI | L | 0R1 01001 | LLLL | LLLL | ADD LITERAL TO ACCUM |
| SUBI | L | 0R1 01010 | LLLL | LLLL | SUBTRACT LITERAL FROM ACCM |
| CMAI | L | 0R1 01111 | LLLL | LLLL | COMPARE LITERAL WITH ACCUM |
| CMPI | L | 0R1 10000 | LLLL | LLLL | COMPARE LITERAL WITH PAR |

L — 8 BIT LITERAL
R — RETURN BIT

TABLE 2-continued

IMMEDIATE INSTRUCTIONS

| MNEMONIC | BINARY 111 111 | | | |
|---|---|---|---|---|
| OPERAND | 543 21098 | 7654 | 3210 | USE |

| 15 | 14 | 13 | 12 11 10 9 8 | 7 6 5 4 3 2 1 0 |
|---|---|---|---|---|
| 0 | R | 1 | OP CODE | OPERAND LITERAL |

TABLE 3

I/O INSTRUCTIONS

| MNEMONIC OPERAND | BINARY 111 111 543 21098 | 7 | 654 | 3210 | USE |
|---|---|---|---|---|---|
| LDAR I | 0R0 00101 | 1 | III | IIII | LOAD ACCUM. WITH I/O REG. |
| LDPR I | 0R0 00110 | 1 | III | IIII | LOAD PAR WITH I/O REGISTER |
| CLRR I | 0R0 00001 | 1 | III | IIII | CLEAR THE I/O REGISTER |
| STAR I | 0R0 00111 | 1 | III | IIII | STORE ACCUM TO I/O REG. |
| STPR I | 0R0 01000 | 1 | III | IIII | STORE PAR TO I/O REGISTER |
| ISTR I | 0R0 10101 | 1 | III | IIII | INCREMENT ACCUM & STORE |
| DSTR I | 0R0 10110 | 1 | III | IIII | DECREMENT ACCUM AND STORE |
| ANDR I | 0R0 00010 | 1 | III | IIII | AND I/O REG. to ACCUM |
| ORR I | 0R0 00011 | 1 | III | IIII | OR I/O REGISTER TO ACCUM |
| XORR I | 0R0 00100 | 1 | III | IIII | XOR I/O REG. TO ACCUM |
| ADDR I | 0R0 01001 | 1 | III | IIII | ADD I/O REG. TO ACCUM |
| SUBR I | 0R0 01010 | 1 | III | IIII | SUBTRACT I/O REG. FROM ACC |
| CMAR I | 0R0 01111 | 1 | III | IIII | COMPARE I/O REG. TO ACCUM |
| CMPR I | 0R0 10000 | 1 | III | IIII | COMPARE I/O REG. TO PAR |

I — I/O REGISTER ADDRESS
R — RETURN BIT

| 15 | 14 | 13 | 12 11 10 9 8 | 7 6 5 4 3 2 1 0 |
|---|---|---|---|---|
| 0 | R | 0 | OP CODE | OPERAND I/O REGISTER ADDRESS |

TABLE 4

DATA MEMORY AND SCRATCHPAD INSTRUCTIONS

| MNEMONIC | OPERAND | BINARY 111 111 543 21098 | 7654 | 3210 | USE |
|---|---|---|---|---|---|
| LDAM | M/Z | 0R0 00101 | 0000 | MMMM | LOAD ACCUM FROM MEMORY M-SCRATCHPAD Z |
| LDPM | M/Z | 0R0 00110 | 0000 | MMMM | LOAD PAR FROM MEMORY M-SCRATCHPAD Z |
| CLRM | M/Z | 0R0 00001 | 0000 | MMMM | CLEAR MEMORY LOCATION M-SCRATCHPAD Z |
| STAM | M/Z | 0R0 00111 | 0000 | MMMM | STORE ACCUM TO MEMORY M-SCRATCHPAD Z |
| STPM | M/Z | 0R0 01000 | 0000 | MMMM | STORE PAR TO MEMORY M-SCRATCHPAD Z |
| ISTM | M/Z | 0R0 10101 | 0000 | MMMM | INCREMENT ACCUM AND STORE TO M/Z |
| DSTM | M/Z | 0R0 10110 | 0000 | MMMM | DECREMENT ACCUM AND STORE TO M/Z |
| ANDM | M/Z | 0R0 00010 | 0000 | MMMM | AND M/Z TO ACCUM |
| ORM | M/Z | 0R0 00011 | 0000 | MMMM | OR M/Z TO ACCUM |
| XORM | M/Z | 0R0 00100 | 0000 | MMMM | XOR M/Z to ACCUM |
| ADDM | M/Z | 0R0 01001 | 0000 | MMMM | ADD M/Z to ACCUM |
| SUBM | M/Z | 0R0 01010 | 0000 | MMMM | SUBTRACT M/Z FROM ACCUM |
| CMAM | M/Z | 0R0 01111 | 0000 | MMMM | COMPARE M/Z TO ACCUM |
| CMPM | M/Z | 0R0 10000 | 0000 | MMMM | COMPARE M/Z TO PAR |

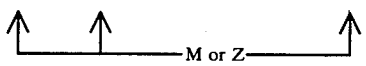

M — 4 BIT MEMORY ADDRESS
Z — 4 BIT SCRATCHPAD ADDRESS
R — RETURN BIT

TABLE 4-continued

DATA MEMORY AND SCRATCHPAD INSTRUCTIONS

| MNEMONIC OPERAND | BINARY 111 111 543 21098 7654 3210 | USE |
|---|---|---|

| 15 14 13 | 12 11 10 9 8 | 7 6 | 5 4 3 2 1 0 |
|---|---|---|---|
| 0 R 0 | OP CODE | | OPERAND DATA MEMORY OR SCR, PAD BYTE ADDRESS |

0 0 = DATA MEMORY
0 1 = SCRATCH PAD

TABLE 5

ONE OPERAND INSTRUCTIONS

| MNEMONIC OPERAND | BINARY 111 543 | 111 21098 | 7654 | 3210 | USE |
|---|---|---|---|---|---|
| NOTA | 0R0 | 10011 | 0000 | 0000 | COMPLEMENT THE ACCUMULATOR |
| INCP | 0R0 | 01011 | 0000 | 0000 | INCREMENT THE PAR |
| INCA | 0R0 | 01100 | 0000 | 0000 | INCREMENT THE ACCUMULATOR |
| DECP | 0R0 | 01101 | 0000 | 0000 | DECREMENT THE PAR |
| DECA | 0R0 | 01110 | 0000 | 0000 | DECREMENT THE ACCUMULATOR |
| ROTL | 0R0 | 10001 | 0000 | 0000 | ROTATE ACCUM LEFT 1 BIT |
| ROTR | 0R0 | 10010 | 0000 | 0000 | ROTATE ACCUM RIGHT 1 BIT |

R — RETURN BIT

| 15 14 13 | 12 11 10 9 8 | 7 6 5 4 3 2 1 0 |
|---|---|---|
| 0 R 0 | OP CODE | 0 0 0 0 0 0 0 0 |

What is claimed is:

1. A document sorter apparatus for sorting documents having data characters recorded thereon, said document sorter apparatus comprising:
   a plurality of document storage locations in which selective ones of said documents are stored;
   a mechanism for transporting said documents into said document storage locations;
   means for reading said data characters on said documents;
   first controller means, responsive to said reading means, for generating a destination code and a tracking code for each document, said destination code signaling one of said document storage locations for storing said presently read document and said tracking code identifying the location of said document relative to said document storage locations;
   means, associated with each of said document storage locations, for sorting said document into said selected one of said document storage locations;
   means, associated with each of said document storage locations, for detecting the presence of a document, said document detection means identifying to said first controller the location of said document; and
   sorter controller means, responsive to said destination code from said first controller means, for controlling the operation of said sorting means to direct said document into said selected one of said document storage locations, said sorter controller means controlling the operation of a predetermined number of said sorting means;
   said sorter controller means including:
   first memory mean for storing program instructions in a plurality of addressable locations;
   second memory means for storing data words in a plurality of addressable locations;
   means for addressing said first memory means and outputting said program instructions;
   means for decoding said program instruction words outputted from said first memory means, said decoding means including third memory means for storing control words useful in controlling the operation of said sorter controller means, said decoding means being operative to generate addresses for said second memory means for the transfer of data words to and from said second memory means; and
   arithmetic logic means for performing arithmetic and logic operations on said data words;
   said decoding means being responsive to said program instructions from said first memory means for addressing said third memory means and for generating, in response thereto, electrical control commands for controlling the operation of said arithmetic logic means and said addressing means.

2. The document sorter apparatus of claim 1 wherein the sorter controller means is operative to control the operation of four of the sorting means.

3. The document sorter apparatus of claim 1 wherein the sorter controller means is operative to control the operation of eight of the sorting means.

4. The document sorter apparatus of claim 1 wherein the decoding means is immediately responsive to the addressing means so as to decode the program instructions in the same clock cycle of the sorter controller means as said program instructions were fetched from the first memory means.

5. The document sorter apparatus of claim 4 wherein the decoding means includes an instruction register for temporarily storing the program instructions outputted from the first memory means, said stored program instructions acting as an address for the third memory means.

6. The document sorter apparatus of claim 5 wherein the addressing means includes a program counter coupled to the instruction register for generating the address of the next instruction word to be fetched from the first memory means.

7. The document sorter apparatus of claim 5 wherein the second memory means includes a plurality of pages, each containing a plurality of addressable data words, with the arithmetic logic means being operative to generate the addresses of selected data words and the instruction register being operative to generate the page address wherein said selected data words are located.

8. The document sorter apparatus of claim 1 wherein the means, associated with each of said document storage locations, for detecting the presence of a document comprises:

means, responsive to said document detecting means, for timing the interval between actuations of said document detecting means.

9. The document sorter apparatus of claim 8 wherein the means for timing the interval between actuations of said document detecting means comprises:

a first comparator, responsive to said document detecting means, for comparing the time of document travel between successive document storage locations to a predetermined interval to detect a document jam;

a second comparator, responsive to the trailing and leading ends of successive documents, to detect proper document spacing; and a third comparator, responsive to the leading and trailing ends of a sorted document, to detect the length of said sorted document; each comparator having a timer reset and initialized by the sorter controller means in response to output generated by the comparators.

* * * * *